(12) United States Patent
Takahashi

(10) Patent No.: US 8,714,631 B2
(45) Date of Patent: May 6, 2014

(54) RAISED AND RECESSED SHEET MATERIAL, AND VEHICLE PANEL AND LAMINATED STRUCTURE USING THE SAME

(71) Applicant: Sumitomo Light Metal Industries, Ltd., Tokyo (JP)

(72) Inventor: Masaya Takahashi, Nagoya (JP)

(73) Assignee: Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 13/928,616

(22) Filed: Jun. 27, 2013

(65) Prior Publication Data

US 2013/0288069 A1    Oct. 31, 2013

Related U.S. Application Data

(63) Continuation of application No. PCT/JP2011/078664, filed on Dec. 12, 2011.

(30) Foreign Application Priority Data

Jan. 17, 2011   (JP) ................................. 2011-007311

(51) Int. Cl.
*B62D 25/10* (2006.01)

(52) U.S. Cl.
USPC .................. 296/191; 296/187.04; 296/193.11

(58) Field of Classification Search
USPC .................. 296/191, 187.04, 187.09, 193.11; 180/69.2, 69.21
See application file for complete search history.

(56) References Cited

U.S. PATENT DOCUMENTS

| | | | |
|---|---|---|---|
| 2,699,599 | A | 1/1955 | Potchen |
| 2,858,247 | A | 10/1958 | De Swart |
| D625,110 | S | 10/2010 | Koenig |
| D673,779 | S | 1/2013 | Takahashi |
| D680,749 | S | 4/2013 | Takahashi |

(Continued)

FOREIGN PATENT DOCUMENTS

| | | |
|---|---|---|
| JP | 09-254955 A1 | 9/1997 |
| JP | 2960402 B1 | 10/1999 |

(Continued)

OTHER PUBLICATIONS

Masaya Takahashi, "*Development of Patterned Shell Structure With High Stiffness*," (CD-ROM Collection of Papers of the 20th Conference of the Japan Society of Mechanical Engineers, Design and Systems Division, Oct. 27, 2010, pp. 102-107.

(Continued)

*Primary Examiner* — Glenn Dayoan
*Assistant Examiner* — Melissa A Black
(74) *Attorney, Agent, or Firm* — Burr & Brown, PLLC

(57) ABSTRACT

A raised and recessed sheet material having extremely high stiffness, and useful vehicle panel and laminated structure using the same. The surface of the sheet is formed by a plurality of squares arranged in two mutually perpendicular directions, and has a raised and recessed pattern. A basic configuration A, where first regions M and a Z-shaped second region N are formed in the square, and basic configurations B to D derived from the basic configuration A are butted together at their peripheral edges such that first regions M having those peripheral edges are butted together and the second regions N having those peripheral edges are butted together. The raised and recessed pattern is formed by upwardly raising the first regions M and downwardly recessing the second regions N, or upwardly raising or downwardly recessing either one or both of the first and second regions M and N.

13 Claims, 26 Drawing Sheets

(56) References Cited

U.S. PATENT DOCUMENTS

| | | |
|---|---|---|
| D680,750 S | 4/2013 | Takahashi |
| D685,194 S | 7/2013 | Takahashi |
| 2013/0108885 A1 | 5/2013 | Takahashi |
| 2013/0295405 A1 | 11/2013 | Takahashi |

FOREIGN PATENT DOCUMENTS

| | | |
|---|---|---|
| JP | 2000-288643 A1 | 10/2000 |
| JP | 2002-038944 A1 | 2/2002 |
| JP | 2002-307117 A1 | 10/2002 |
| JP | 3332353 B2 | 10/2002 |
| JP | 2002-321018 A1 | 11/2002 |
| JP | 2004-106002 A1 | 4/2004 |
| JP | 2004-106022 | 4/2004 |
| JP | 4388558 B2 | 12/2009 |
| WO | 2012/081269 A1 | 6/2012 |
| WO | 2012/090685 A1 | 7/2012 |
| WO | 2012/096085 | 7/2012 |
| WO | 2012/098787 | 7/2012 |
| WO | 2012/098787 A1 | 7/2012 |

OTHER PUBLICATIONS

International Search Report dated Mar. 19, 2012 (with English translation).

(a)

(b)

(c)

(d)

(a)

(b)

(c)

(a)

(b)

(c)

(a)

(b)

(c)

(a)

(b)

(c)

(a)

(b)

(c)

(a)

(b)

(a)

(b)

(a)

(b)

(a)

(b)

(a)

(b)

RAISED AND RECESSED SHEET MATERIAL, AND VEHICLE PANEL AND LAMINATED STRUCTURE USING THE SAME

This application is a continuation of the International Application No. PCT/JP2011/078664 filed on Dec. 12, 2011, which claims the benefit under 35 U.S.C. §119(a)-(d) of Japanese Patent Application No. 2011-007311 filed on Jan. 17, 2011, the entireties of which are incorporated herein by reference.

BACKGROUND OF THE INVENTION

1. Field of the Invention

The present invention relates to a raised and recessed sheet material, and a vehicle panel and a laminated structure using the same, and particularly to a sheet material having extremely improved stiffness due to the formation of raised and recessed portions, and a laminated structure and a vehicle panel having a high degree of stiffness and excellent energy absorbing properties obtained by using such a sheet material.

2. Description of Related Art

Conventionally, in order to reduce the weight of a vehicle, it is considered to replace a material of a vehicle component made of a steel sheet or the like with a material having a light weight, such as an aluminum alloy sheet, and vehicle components made of such light weight material are practically used. However, it goes without saying that the stiffness required for the component needs to be maintained even when the weight of the component is reduced.

In order to improve the stiffness of a sheet material without increasing its thickness, it has been considered to improve the stiffness by forming the sheet material so as to have a corrugated shape or a raised and recessed pattern. For example, Patent Document 1 proposes, as a material of a vehicle component called a heat insulator, a sheet material having many raised portions formed by embossing in order to secure an isotropic stiffness of the sheet material without increasing its thickness. Patent Documents 2-6, for example, propose various sheet materials which are used for various applications as well as the heat insulator and which have improved stiffness owing to formation of raised and recessed portions by embossing, for example.

In fact, the sheet material having many raised and recessed portions, such as the one of Patent Document 1, has a stiffness about two times that of a sheet material having no raised and recessed portions, making it possible to reduce its weight by about 20%. The sheet material having the corrugated shape have different degrees of stiffness in respective different directions, so that even if its stiffness is improved in one direction, a desired improvement of stiffness may not be achieved in the other directions. Thus, it has not been clear as to the optimal configuration of the raised and recessed portions which can improve the stiffness of the sheet material without increasing its thickness. There is always a demand for improving the stiffness of the sheet material at higher levels than ever. Further, in various machines and apparatus as well as automobiles, there is a demand for minimizing the weight of the part made of the sheet material. Moreover, there is not only the demand for the reduction of the weight, but also a need for reduction of the material cost. Also, the sheet material (planar material) is required to have improved stiffness regardless of its material.

Further, there is a demand for improving the stiffness of a laminated structure or a vehicle panel, as compared with conventional ones, by using the above-described raised and recessed sheet material having a high effect of improvement of the stiffness as a component of the laminated structure or an inner or outer panel of the vehicle.

Therefore, the present inventor disclosed in Non-Patent Document 1, that where the sheet material is obtained by repeatedly forming H-shaped patterns on a flat sheet so as to form a shell structure with raised and recessed portions, the sheet material can have a bending stiffness more than ten times that of the flat sheet in any direction, making it possible to improve the weight reduction percent value to 50% or more. However, the present inventor made a further study on the sheet material having the shell structure, and found that the effect of improvement of its surface stiffness is insufficient as compared with the effect of improvement of its bending stiffness, and that even the bending stiffness of the sheet material is not sufficient for satisfying a requirement for further improvement depending on its application.

PRIOR ART DOCUMENTS

Patent Documents

Patent Document 1: Japanese Patent No. 4388558
Patent Document 2: Japanese Patent No. 3332353
Patent Document 3: JP-A-9-254955
Patent Document 4: JP-A-2000-288643
Patent Document 5: JP-A-2002-307117
Patent Document 6: JP-A-2002-321018

Non-Patent Document

Non-Patent Document 1:CD-ROM collection of papers of the 20$^{th}$ Conference of the Japan Society of Mechanical Engineers, Design and Systems Division, pages 102-107

SUMMARY OF THE INVENTION

The present invention was made in view of the background art described above. Accordingly, it is an object of the present invention to provide a sheet material having improved stiffness due to the formation of the raised and recessed portions, which sheet material has a raised and recessed pattern which can effectively improve the stiffness of the sheet material and advantageously reduce its weight. It is another object of the present invention to provide a useful vehicle panel and laminated structure obtained by using such a sheet material.

To achieve the above-described objects, or solve the problems apparent from the description throughout the present specification and drawings, the present invention can be preferably embodied in various preferred modes which will be described below. The preferred modes of the invention described below may be practiced in any combination. It is to be understood that the preferred modes and technical features of the present invention are not limited to those described below, and can be recognized based on the inventive concept disclosed in the whole specification and the drawings.

According to a first aspect of the present invention, a raised and recessed sheet material is provided, having a surface which is formed by a plurality of imaginary squares arranged in two mutually perpendicular directions and which has a raised and recessed pattern, wherein an entire pattern of the surface is formed by a plurality of four imaginary basic configurations comprising, a basic configuration A which is divided into three parts by a first partition line and a second partition line, the first partition line successively connecting points $A_1$, $A_2$, $A_3$ and $A_4$ which are respectively indicated as (a, 6a), (a, 3.5a~4a), (3a, a) and (0, a) in a two-dimensional orthogonal system where a length L of each side of each of the above-described squares is divided into six equal segments, provided that L=6a, and the second partition line successively connecting points $B_1$ (6a, 5a), $B_2$ (3a, 5a), $B_3$ (5a, 2a~2.5a) and $B_4$ (5a, 0), the first partition line linearly connecting the points $A_1$ and $A_2$, and the points $A_3$ and $A_4$, the second partition line linearly connecting the points $B_1$ and $B_2$, and the points $B_3$ and $B_4$, a connecting line connecting the points $A_2$ and $A_3$ of the first partition line and a connecting line connecting the points $B_2$ and $B_3$ of the second partition line being spaced apart from a diagonal line connecting opposite corners (0, 6a) and (6a, 0) of the square, and located so as to be rotationally symmetrical to each other with respect to a midpoint of the diagonal line, parts of the square not located between the first and second partition lines being defined as first regions, and a part of the square located between the first and second partition lines being defined as a second region having a Z-shape as seen in a back view, a basic configuration B having the first regions and the Z-shaped second region which are arranged so as to be line-symmetrical to the basic configuration A, a basic configuration C obtained by rotating the basic configuration B by 90 degrees, the part of the square located between the first and second partition lines being defined as a Z-shaped first region, and the parts of the square not located between the first and second partition lines being defined as second regions, and a basic configuration D having the Z-shaped first region and the second regions which are arranged so as to be line-symmetrical to the basic configuration C, the plurality of four basic configurations are arranged in the two mutually perpendicular directions while being butted on each other at their peripheral edges such that the first regions of the basic configurations having those peripheral edges are butted together, while the second regions of the basic configurations having those peripheral edges are butted together, the raised and recessed pattern is formed on the entire surface by locating the first and second partition lines of each basic configuration in a first reference plane which is an intermediate one of three mutually parallel imaginary reference planes which are spaced apart from each other in a vertical direction perpendicular to a plane of the sheet material, upwardly raising the first region of each basic configuration such that a raised portion of the first region is located in a second reference plane which is spaced upwardly from the first reference plane, and downwardly recessing the second region of each basic configuration such that a recessed portion of the second region is located in a third reference plane which is spaced downwardly from the first reference plane, or by locating the first and second partition lines of each basic configuration in one of two mutually parallel imaginary reference planes which are spaced apart from each other in the above-described vertical direction, and upwardly raising or downwardly recessing either one or both of the first and second regions of each basic configuration such that the raised portion or the recessed portion is located in the other reference plane.

According to a second aspect, the raised and recessed sheet material according to the above first aspect is provided, wherein the connecting lines respectively connecting the points $A_2$ and $A_3$ and the points $B_2$ and $B_3$ are straight lines or curved lines.

According to a third aspect, the raised and recessed sheet material according to the above first or second aspects is provided, wherein at least one of the raised portion and the recessed portion has a flat surface in the reference plane in which each of the at least one of the raised portion and the recessed portion is located.

According to a fourth aspect, the raised and recessed sheet material according to any one of the above first to third aspects is provided, wherein the surface of the sheet material is formed by using all of the basic configurations A to D.

According to a fifth aspect, the raised and recessed sheet material according to any one of the above first to third aspects is provided, wherein the surface of the sheet material is formed by using three of the basic configurations A to D.

According to a sixth aspect, the raised and recessed sheet material according to any one of the above first to third aspects is provided, wherein the surface of the sheet material is formed by using two of the basic configurations A to D.

According to a seventh aspect of the present invention, the raised and recessed sheet material according to any one of the above first to sixth aspects is provided, wherein side surfaces of the upwardly raised or downwardly recessed portion of the first region and/or the second region have inclination angles within a range of 10° to 90°.

According to an eighth aspect of the present invention. the raised and recessed sheet material according to any one of the above first to seventh aspects is provided, wherein the sheet material is obtained by forming the raised and recessed pattern on a metal sheet by press forming.

According to a ninth aspect, the raised and recessed sheet material according to the above eighth aspect is provided, wherein the metal sheet before the press forming has a thickness of 0.03 mm to 6.00 mm.

According to a tenth aspect, the raised and recessed sheet material according to the above eighth or ninth aspect is provided, wherein a ratio L/t between the above-described length L(mm) of each side of the square and a thickness t(mm) of the metal sheet before the press forming is 10 to 2000.

According to an eleventh aspect, the raised and recessed sheet material according to any one of the above eighth to tenth aspects is provided, wherein a relationship among a distance H(mm) between adjacent ones of the reference planes, the thickness t(mm) of the metal sheet before the press forming, and a maximum inclination angle θ(°) of the side surfaces of the upwardly raised or downwardly recessed portion of the first region and/or the second region satisfies an equation: $1 \leq H/t \leq -3\theta + 272$.

According to a twelfth aspect, a laminated structure is provided, obtained by stacking a plurality of sheet materials, wherein at least one of the plurality of sheet materials is the raised and recessed sheet material according to any one of the above first to eleventh aspects.

According to a thirteenth aspect, a vehicle panel comprising an outer panel and an inner panel joined to a back surface of the outer panel, wherein either one or both of the outer panel and the inner panel is/are constituted by the raised and recessed sheet material according to any one of the above first to eleventh aspects.

Thus, in the raised and recessed sheet material according to the present invention, the raised and recessed pattern is formed on the surface by combining the plurality of the four basic configurations A to D having Z-shaped patterns that are different from each other, so as to be successively arranged in two mutually perpendicular directions according to the raised and recessed patterns of the first and second regions, making it possible to advantageously realize a sheet material having improved stiffness, excellent vibration damping property and excellent echo suppression property.

Particularly, by employing the basic configurations having the Z-shaped patterns, the entire surface is formed by the Z-shaped raised and recessed patterns which are combined and arranged with each other. Accordingly, the sheet material can maintain a high degree of bending stiffness with small anisotropy while significantly improving its surface stiffness, thereby effectively exhibiting a high effect of improvement of its stiffness and reduction of its weight.

Thus, according to the present invention, it is possible to advantageously obtain a raised and recessed sheet material having a reduced weight, a significantly increased effect of improvement of its stiffness, and excellent energy absorbing property as compared with the conventional raised and recessed sheet material.

Further, the present invention has an advantage that a laminated structure having extremely high stiffness and excellent energy absorbing property can be easily obtained by using the above-described raised and recessed sheet material having improved stiffness as a component of the laminated structure.

According to the present invention, it is also possible to easily obtain a vehicle panel having extremely high stiffness and excellent energy absorbing property by using the above-described raised and recessed sheet material having improved stiffness as an inner and/or outer panel of the vehicle.

DETAILED DESCRIPTION OF THE INVENTION

To further clarify the present invention, there will be described in detail the preferred embodiments of the present invention by reference to the accompanying drawings.

Figure 1:
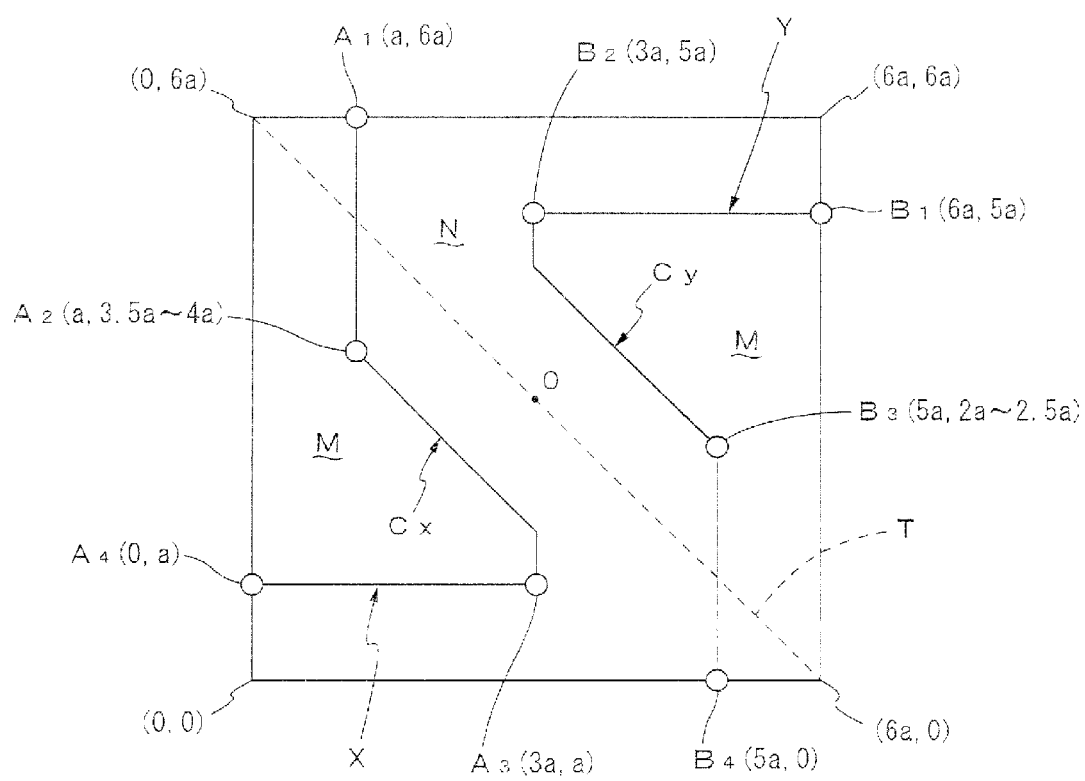
FIG. 1 is a plan view showing an arrangement of first and second partition lines in an example of an basic configuration A according to the present invention.

Referring first to the plan view of FIG. 1, there is shown an example of a basic configuration A as a base of basic configurations or shapes (basic units) of a raised and recessed sheet material according to the present invention, together with an arrangement pattern of first and second partition lines. As shown in FIG. 1, the basic configuration A is a square which is divided into three parts by a first partition line X and a second partition line Y. The parts of the square which are not located between the first and second partition lines X and Y, namely, the part defined by the first partition line X and an outline of the square and the part defined by the second partition line Y and the outline of the square, are defined as first regions M, while the part of the square located between the first and second partition lines X and Y is defined as a second region N which has a Z-shape as seen in the back view. Here, the Z-shape is interpreted to include a figure which appears to have an N-shape or an angular S-shape obtained by rotating or turning over the Z-shape.

More specifically described, the first partition line X and the second partition line Y which define the basic configuration A are respectively obtained by successively connecting points $A_1$ to $A_4$ and points $B_1$ to $B_4$. Here, the points $A_1, A_2, A_3$ and $A_4$ of the first partition line X are respectively indicated as $(a, 6a)$, $(a, 3.5a\text{--}4a)$, $(3a, a)$ and $(0,a)$ in a two-dimensional orthogonal coordinate system where a length L of each side of the square is divided into six equal segments, and provided that $L=6a$. The points $A_1$ and $A_2$ are linearly connected to each other, and the points $A_3$ and $A_4$ are linearly connected to each other. The points $B_1, B_2, B_3$ and $B_4$ of the second partition line Y are respectively indicated as $(6a, 5a)$, $(3a, 5a)$, $(5a, 2a\text{--}2.5a)$ and $(5a,0)$ in the above-described two-dimensional orthogonal coordinate system. The points $B_1$ and $B_2$ are linearly connected to each other and the points $B_3$ and $B_4$ are linearly connected to each other. A connecting line $C_X$ of the first partition line X which connects the points $A_2$ $(a, 3.5a\text{--}4a)$ and $A_3(3a, a)$ and a connecting line $C_Y$ of the second partition line Y which connects the points $B_2$ $(3a, 5a)$ and $B_3$ $(5a, 2a\text{--}2.5a)$ are principally constituted by inclined straight lines which are spaced apart from a diagonal line T connecting opposite corners $(0, 6a)$ and $(6a, 0)$ of the square. The connecting lines $C_X$ and $C_Y$ are located rotationally symmetrically to each other with respect to a midpoint O of the diagonal line T. In other words, each one of the connecting lines $C_X$ and $C_Y$ is obtained by rotating the other connecting line by 180 degrees about the midpoint O of the diagonal line T. The points $A_2$ and $B_3$ may be moved by a distance 0.5a in a vertical direction as seen in FIG. 1, and the objects of the present invention can be sufficiently achieved even when the points $A_2$ and $B_3$ are moved as described above.

Figure 2:
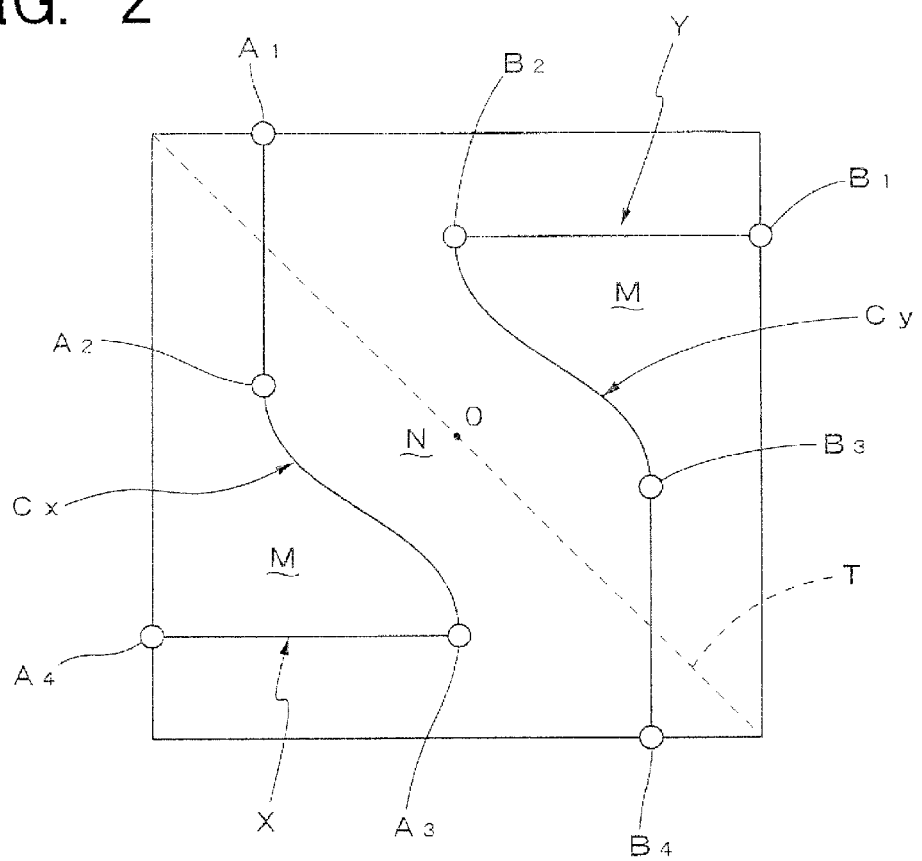
FIG. 2 is a view corresponding to that of FIG. 1, showing another example of a connecting line between points $A_2$ and $A_3$ and a connecting line between points $B_2$ and $B_3$ of the respective first and second partition lines which define the basic configuration A.

As for the distance from the diagonal line T to the respective two connecting lines $C_X$ and $C_Y$ it is preferable that the shortest distance between the two connecting lines $C_X$ and $C_Y$ is set to be not less than ⅙ of the length of each side of the square of the basic configuration A, namely, not less than the unit segment length "a". (In FIG. 1, the distance between the two connecting lines $C_X$ and $C_Y$ is about $2a$). By securing a sufficient distance between the two connecting lines $C_X$ and $C_Y$ it is possible to obtain a basic configuration which is suitable for upwardly raising or downwardly recessing the first and second regions M and N, thereby effectively achieving the functions and advantages of the present invention. In FIG. 1, the connecting line $C_X$ connecting the points $A_2$ and $A_3$ and the connecting line $C_Y$ connecting the points $B_2$ and $B_3$ are principally constituted by straight lines (oblique lines) which are inclined at a predetermined angle with respect to each side of the square. However, the two connecting lines $C_X$ and $C_Y$ may be lines in any known form, such as bent lines, or curved lines as shown in FIG. 2, which are spaced apart from the diagonal line T.

Figure 3:
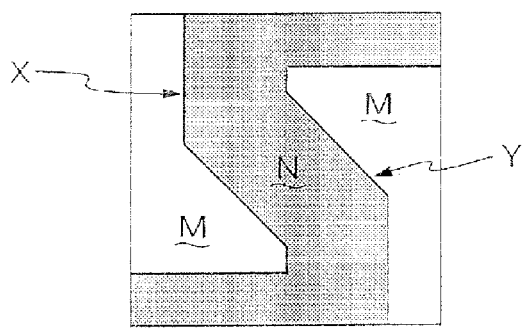
FIGS. 3(a)-(d) are plan views showing examples of four basic configurations according to the present invention, with FIG. 3(a) showing the basic configuration A, FIG. 3(b) showing a basic configuration B, FIG. 3(c) showing a basic configuration C, and FIG. 3(d) showing a basic configuration D.
Figure 3:
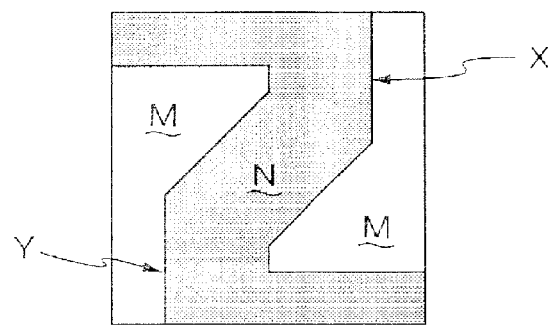
Figure 3:
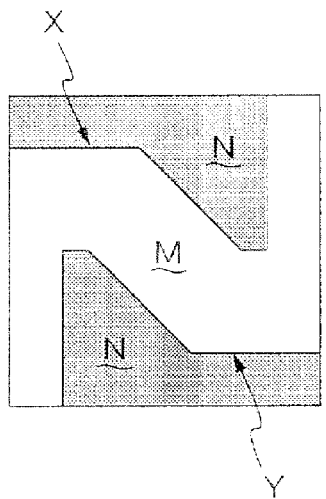
Figure 3:
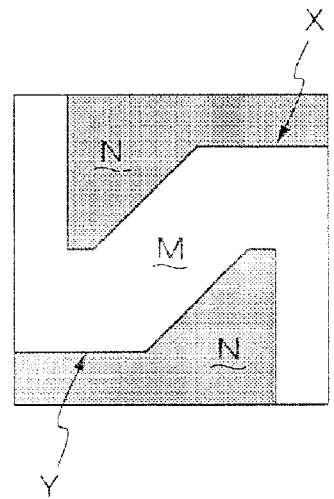

In the present invention, three basic configurations derived from the basic configuration A, namely, basic configurations B, C and D which are derived from the basic configuration A shown in FIG. 1 and which are respectively shown in FIGS. 3(b), 3(c) and 3(d) are used, as well as the basic configuration A, in a suitable combination. More specifically described, FIG. 3(a) corresponds to the basic configuration A shown in FIG. 1. FIG. 3(b) shows the basic configuration B which is line-symmetrical to the basic configuration A shown in FIG. 3(a) with respect to one of the four sides of the square, for example. The first regions M and the second region N of the basic configuration B are arranged so as to be bilaterally symmetrical to those of the basic configuration A. The basic configuration C shown in FIG. 3(c) is obtained by rotating the basic configuration B shown in FIG. 3(b) by 90 degrees about one corner of the square. The first and second regions M and N of the basic configuration C are arranged so as to be reversed with respect to the basic configuration B. Namely, in the basic configuration C, a part of the square located between the first partition line X and the second partition line Y is defined as a Z-shaped first region M, and parts of the square which are not located between the first and second partition lines X and Y are defined as two second regions N. The basic configuration D shown in FIG. 3(d) has a Z-shaped first region M and two second regions N which are arranged so as to be line-symmetrical to the basic configuration C shown in FIG. 3(c) with respect to one of the four sides of the square, for example. Namely, the first region M having a Z-shape as seen in the back view and the two second regions N of the basic configuration D are arranged so as to be bilaterally symmetrical to those of the basic configuration C. In the four basic configurations A to D shown in FIGS. 3, the regions are indicated by white and gray areas in order to clarify the regions which are raised or recessed in the same direction to form three-dimensional configurations. The first regions M are indicated as white-colored areas and the second regions N are indicated as gray-colored areas.

In the present invention, an entire configuration of a surface of the desired sheet material is obtained by successively combining a plurality of the four basic configurations A to D in two mutually perpendicular directions. The plurality of the four basic configurations A to D are butted on each other at their peripheral edges such that the first regions M of the configurations having those peripheral edges are butted together, while the second regions N of the configurations having those peripheral edges are butted together. The four basic configurations A to D are formed as three-dimensional configurations having upwardly raised portions and/or downwardly recessed portions such that raised and recessed portions are formed on the surface of the sheet material.

Figure 4:
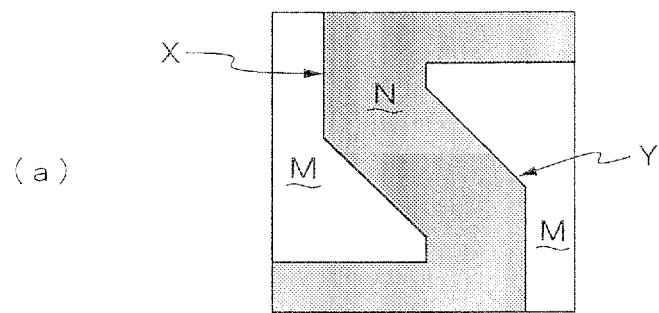
FIGS. 4(a)-(c) are schematic views showing an example of the basic configuration A according to the present invention, with FIG. 4(a) being a plan view showing an example of a pattern of first and second regions of the basic configuration A, FIG. 4(b) being a plan view of the basic configuration A having a raised and recessed pattern, and FIG. 4(c) being a perspective view of the basic configuration A.
Figure 4:
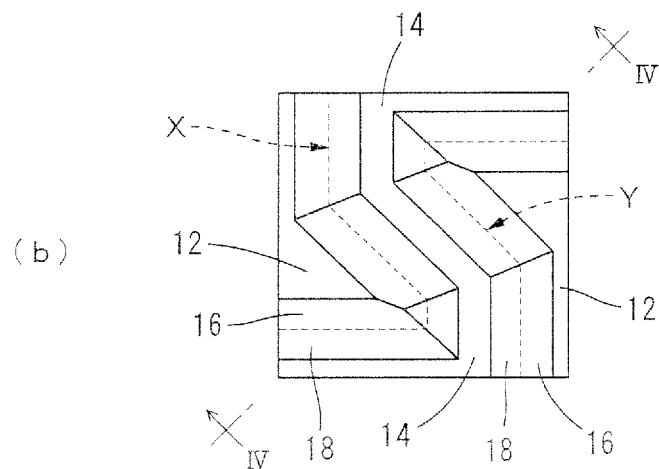
Figure 4:
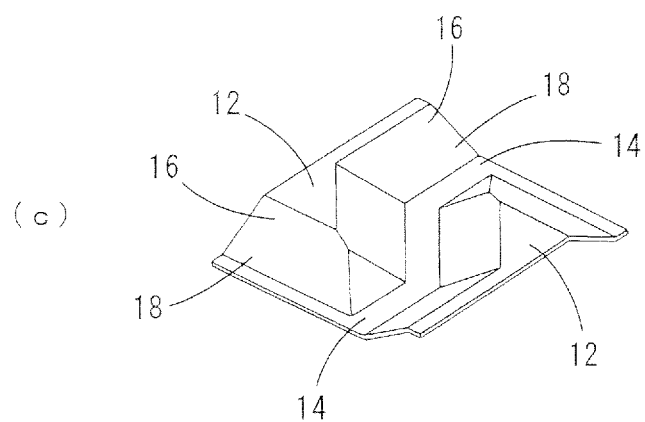
Figure 5:
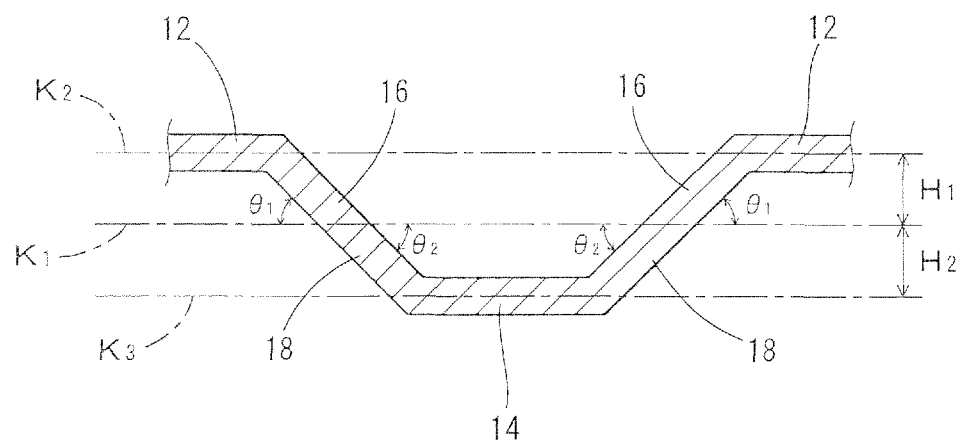
FIG. 5 is a partially enlarged cross sectional view taken along a line IV-IV of FIG. 4(b).

More specifically described, the basic configuration A shown in FIGS. 1 and 3(a) is formed as a three-dimensional configuration having upwardly raised and downwardly recessed portions as shown in FIG. 4. In FIG. 4(a) corresponding to FIG. 3(a), the white-colored first regions M are raised upwardly (in a vertically upward direction with respect to the plane of the sheet) by a predetermined height, and the gray-colored second region N is recessed downwardly (in a vertically downward direction with respect to the plane of the sheet) by a predetermined depth, whereby the basic configuration A is formed as the three-dimensional configuration having a raised and recessed pattern as shown in FIGS. 4(b) and 4(c). The first and second partition lines X and Y of the basic configuration A are located in a first reference plane $K_1$ which is an intermediate one of three mutually parallel imaginary reference planes $K_1$ to $K_3$ which are spaced apart from each other in the vertical direction, as shown in FIG. 5 showing a part of the basic configuration A in cross section taken along a line IV-IV of FIG. 4(b). The white-colored first regions M are raised upwardly such that raised portions 12 of the first regions M are located in the second reference plane $K_2$ which is spaced upwardly from the first reference plane $K_1$ by a distance $H_1$. The gray-colored second region N is recessed downwardly such that a recessed portion 14 of the second region N is located in the third reference plane $K_3$ which is spaced downwardly from the first reference plane $K_1$ by a distance $H_2$. By upwardly raising the first regions M, there are formed side walls 16 consisting of inclined side surfaces extending from the first reference plane $K_1$ to the second reference plane $K_2$. The side walls 16 have a predetermined inclination or slope angle $\theta_1(°)$ with respect to the first reference plane $K_1$. By downwardly recessing the second region N, there are formed side walls 18 consisting of inclined side surfaces extending from the first reference plane $K_1$ to the third reference plane $K_3$. The side walls 18 have a predetermined inclination or slope angle $\theta_2(°)$ with respect to the first reference plane $K_1$.

Figure 6:
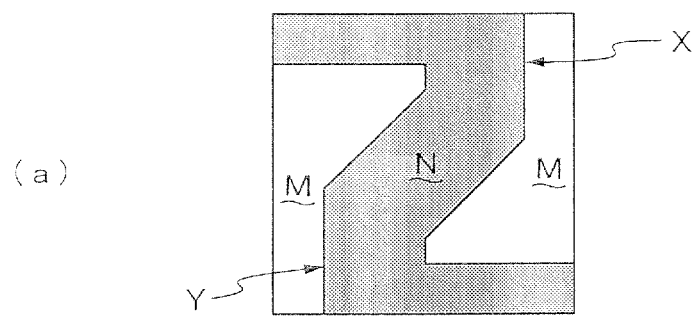
FIGS. 6(a)-(c) are schematic views showing an example of the basic configuration B according to the present invention, with FIG. 6(a) being a plan view showing an example of a pattern of the first and second regions of the basic configuration B, FIG. 6(b) being a plan view of the basic configuration B having the raised and recessed pattern, and FIG. 6(c) being a perspective view of the basic configuration B.
Figure 6:
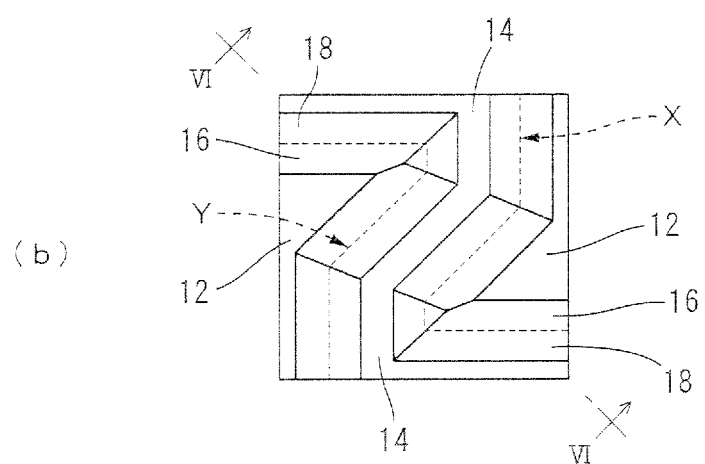
Figure 6:
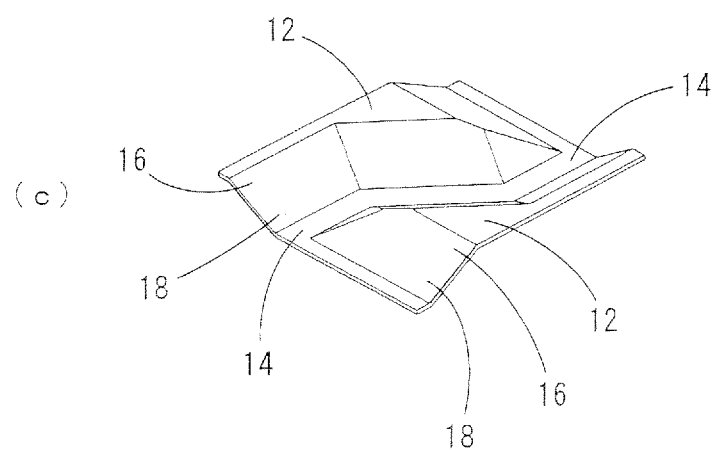

The basic configuration B shown in FIG. 3(b) is formed as a three-dimensional configuration having a raised and recessed pattern which is line-symmetric with respect to the above-described basic configuration A, and details of which are shown in FIG. 6. In FIG. 6(a) corresponding to FIG. 3(b), the white-colored first regions M are raised upwardly and the gray-colored second region N is recessed downwardly, as in the basic configuration A, whereby the three-dimensional configuration having a raised and recessed pattern as shown in FIGS. 6(b) and 6(c) is formed. A part of the basic configuration B in cross section taken along a line VI-VI of FIG. 6(b) has a cross sectional structure similar to that shown in FIG. 5, in which the raised portions 12 are formed in the first regions M so as to be located in the second reference plane $K_2$, and the recessed portion 14 is formed in the second region N so as to be located in the third reference plane $K_3$.

Figure 7:
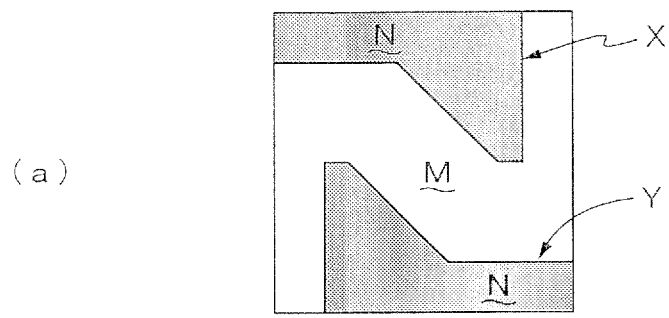
FIGS. 7(a)-(c) are schematic views showing an example of the basic configuration C according to the present invention, with FIG. 7(a) being a plan view showing an example of a pattern of the first and second regions of the basic configuration C, FIG. 7(b) being a plan view of the basic configuration C having the raised and recessed pattern, and FIG. 7(c) being a perspective view of the basic configuration C.
Figure 7:
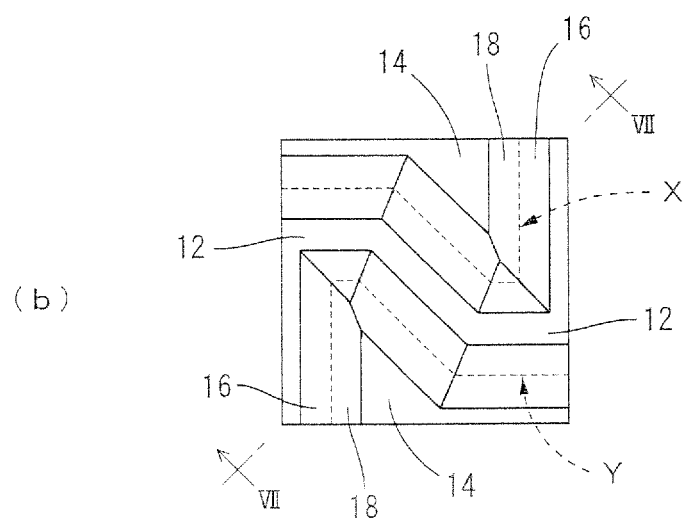
Figure 7:
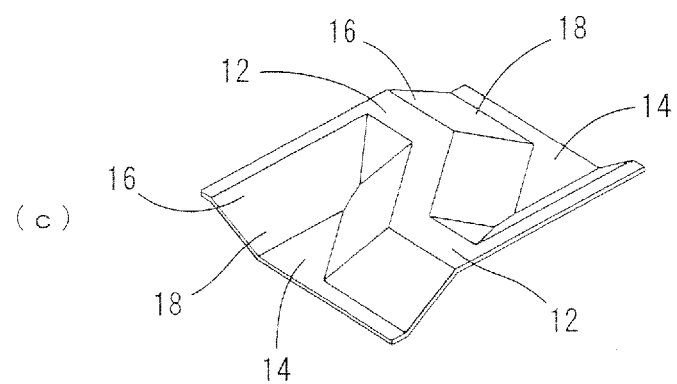
Figure 8:
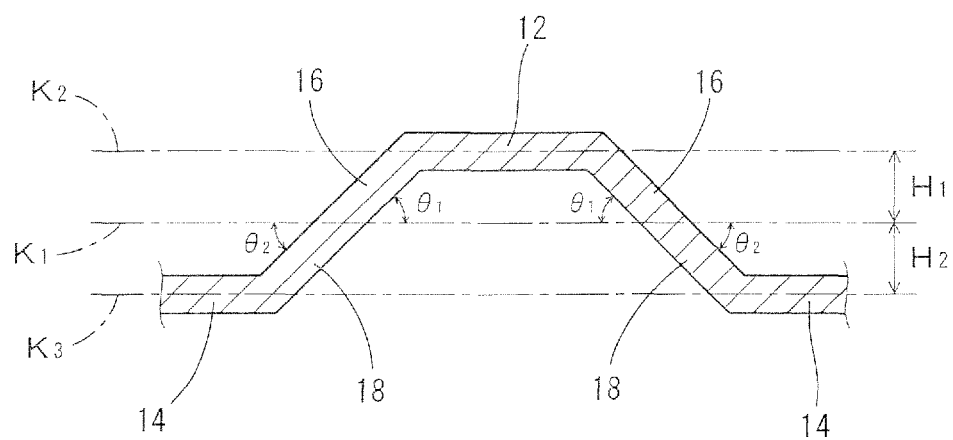
FIG. 8 is a partially enlarged cross sectional view taken along a line VII-VII of FIG. 7(b).

In the basic configuration C shown in FIG. 3(c), the first and second regions M and N are arranged so as to be reversed with respect to the first and second regions M and N of the above-described basic configuration B. Accordingly, in the basic configuration C, the Z-shaped first region M lies on its side and is raised upwardly, and the two second regions N are recessed downwardly. FIG. 7 schematically show the basic configuration C, and FIG. 7(a) corresponds to FIG. 3(c). The basic configuration C is formed so as to have a raised and recessed pattern which is reversed with respect to the above-described basic configuration B, as shown in FIGS. 7(b) and 7(c). As is apparent from FIG. 8 showing a part of a cross section taken along a line VII-VII of FIG. 7(b), the white-colored first region M is raised upwardly from the first reference plane $K_1$ by the distance $H_1$ such that the raised portion 12 of the first region M is located in the second reference plane $K_2$, while the gray-colored second regions N are recessed downwardly from the first reference plane $K_1$ by the distance $H_2$ such that the recessed portions 14 of the second regions N are located in the third reference plane $K_3$.

Figure 9:
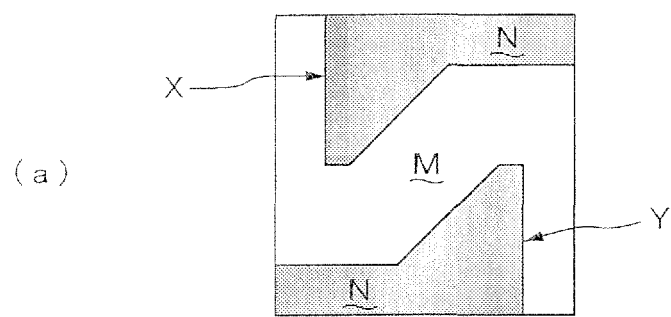
FIGS. 9(a)-(c) are schematic views showing an example of the basic configuration D according to the present invention, with FIG. 9(a) being a plan view showing an example of a pattern of the first and second regions of the basic configuration D, FIG. 9(b) being a plan view of the basic configuration D having the raised and recessed pattern, and FIG. 9(c) being a perspective view of the basic configuration D.
Figure 9:
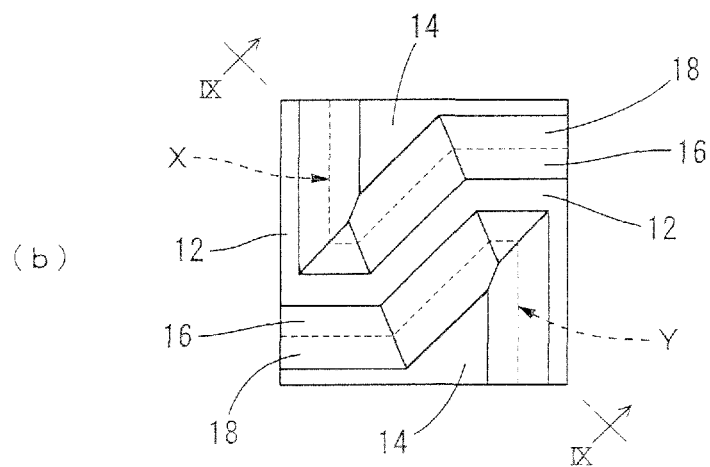
Figure 9:
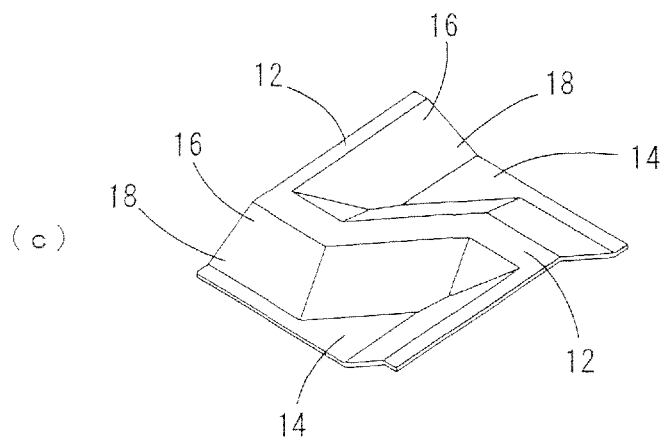

In the basic configuration D shown in FIG. 3(d), a raised and recessed pattern is formed so as to be line-symmetric with respect to the above-described basic configuration C. FIG. 9 schematically show the basic configuration D. In FIG. 9(a) corresponding to FIG. 3(d), the white-colored first region M having a Z-shape as seen in the back view is raised upwardly, and the gray-colored second regions N are recessed downwardly, whereby the basic configuration D is formed as a three-dimensional configuration having the raised and recessed pattern as shown in FIGS. 9(b) and 9(c). A cross sectional shape taken along a line IX-IX of FIG. 9(b) is similar to that shown in FIG. 8. The first region M is raised upwardly such that the raised portion 12 is located in the second reference plane $K_2$, thereby forming the side walls 16 consisting of the side surfaces having the predetermined inclination angle $\theta_1(°)$. The second regions N are recessed downwardly such that the recessed portions 14 are formed so as to have the side walls 18 consisting of the side surfaces having the predetermined inclination angle $\theta_2(°)$.

All of the basic configurations A to D illustrated in FIGS. 4-9 are formed so as to have the raised and recessed patterns including the raised portions 12 formed by upwardly raising the first regions M, and the recessed portions 14 formed by downwardly recessing the second regions N. However, it is possible to form a raised and recessed pattern by upwardly raising or downwardly recessing either one of the first and second regions M and N. In other words, the raised and recessed pattern is formed by locating the first and second partition lines X and Y of the basic configurations A to D in one of the two mutually parallel imaginary reference planes $K_1$ and $K_2$ which are spaced apart from each other in the vertical direction, while upwardly raising or downwardly recessing either one of the first and second regions M and N of the basic configurations A to D such that the raised or recessed portions are located in the other reference plane. An example of the above-described raised and recessed pattern is shown in FIGS. 10 and 11.

Figure 10:
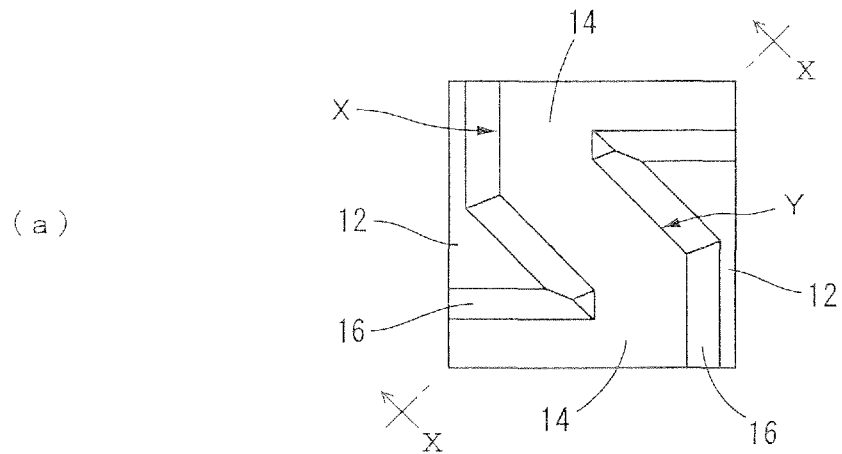
FIGS. 10(a)-(c) are schematic views showing other examples of the raised and recessed pattern of the basic configuration A or B, with FIG. 10(a) being a view corresponding to that of FIG. 4(b), showing an example of the basic configuration A with the second region N being a flat portion which is not recessed downward, FIG. 10(b) being a plan view corresponding to that of FIG. 6(b), showing an example of the basic configuration B with the second region N being a flat portion, and FIG. 10(c) being a partially enlarged cross sectional view taken along lines X-X of FIGS. 10(a) and 10(b).
Figure 10:
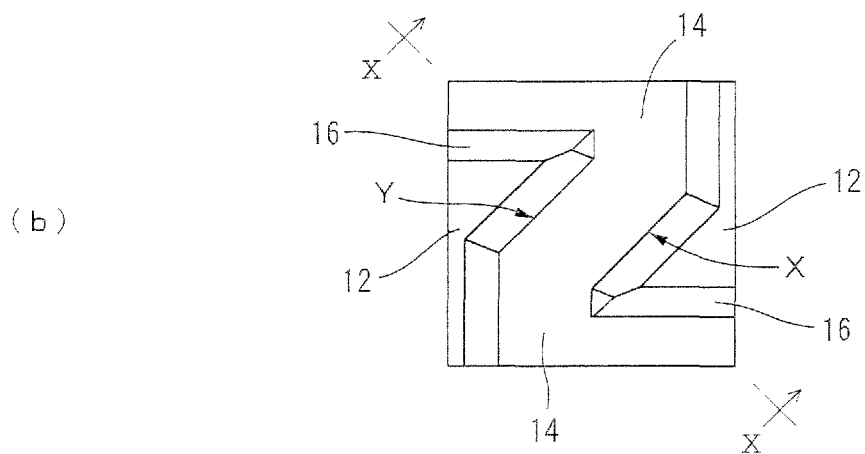
Figure 10:
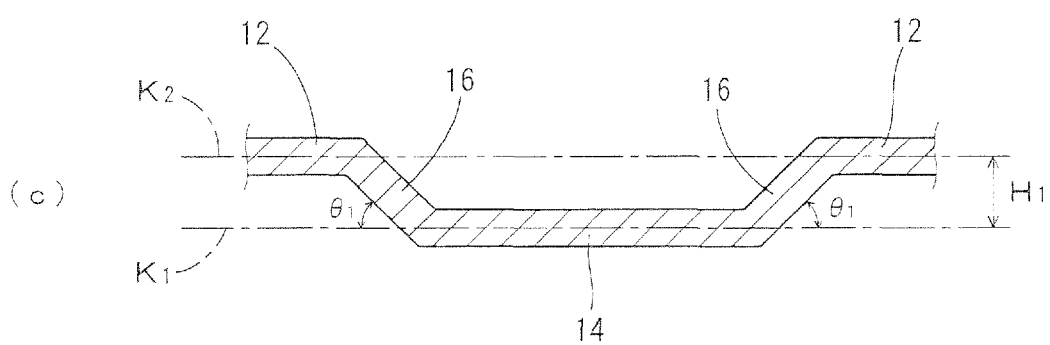
Figure 11:
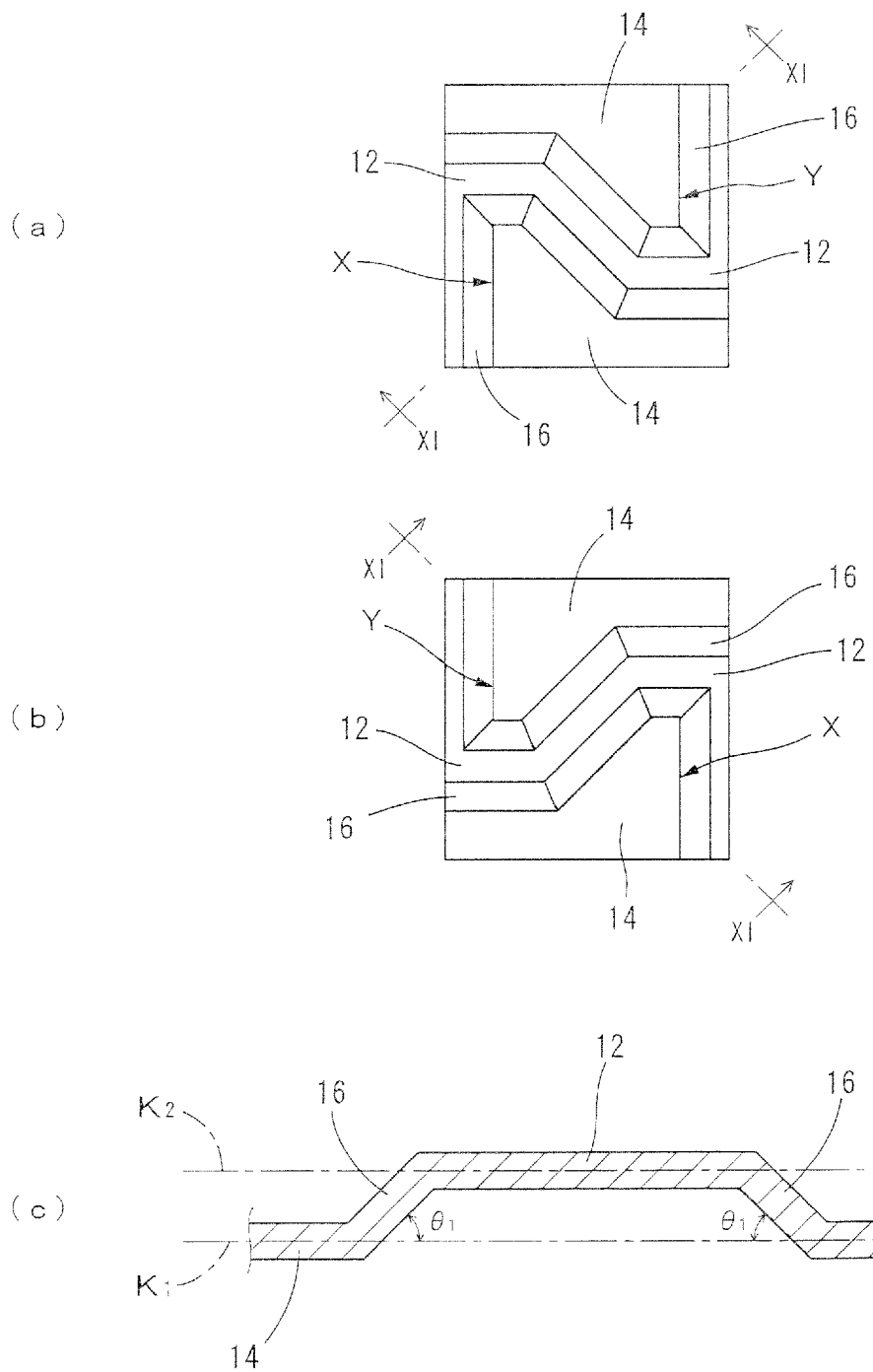
FIGS. 11(a)-(c) are schematic views showing other examples of the basic configurations with the second regions N being not recessed downward as in the examples of FIGS. 10, with FIG. 11(a) being a plan view corresponding to that of FIG. 7(b) showing the basic configuration C, FIG. 11(b) being a plan view corresponding to that of FIG. 9(b) showing the basic configuration D, and FIG. 11(c) being a partially enlarged cross sectional view taken along lines XI-XI of FIGS. 11(a) and 11(b).

In the basic configurations A to D shown in FIGS. 10 and 11, only the first regions M are raised upwardly so as to form the raised portions 12, and the second regions N constitute the flat recessed portions 14. More specifically described, in FIG. 10(a) showing the basic configuration A and corresponding to FIG. 4(b), there is formed the flat recessed portion 14 having an area corresponding to the area of the second region N. In FIG. 10(b) showing the basic configuration B and corresponding to FIG. 6(b), there is formed the flat recessed portion 14 having the same area as the second region N. FIG. 10(c) is a schematic view showing a part of a cross section taken along lines X-X of FIGS. 10(a) and 10(b), and corresponds to FIG. 5. In FIG. 10(c), the recessed portion 14 is located in the first reference plane $K_1$, and the raised portions 12 are located in the second reference plane $K_2$ which is spaced upwardly from the first reference plane $K_1$ by the predetermined distance $H_1$. The inclined side walls 16 are formed so as to have the predetermined inclination angle $\theta_1(°)$ with respect to the first reference plane $K_1$ as in the case of FIG. 8.

FIG. 11(a) corresponding to FIG. 7(b) shows the basic configuration C having the raised portion 12 formed by upwardly raising only the first region M and the flat recessed portions 14 having areas corresponding to the areas of the second regions N. FIG. 11(b) corresponding to FIG. 9(b) shows the basic configuration D having the raised portion 12 formed by upwardly raising only the first region M and the flat recessed portions 14 having the same areas as the second regions N. FIG. 11(c) corresponding to FIG. 8 shows an enlarged partial cross sectional shape taken along lines XI-XI of FIGS. 11(a) and 11(b). Since the cross sectional shape shown in FIG. 11(c) is similar to that shown in FIG. 10(c), the same reference signs as used in FIG. 10(c) are used to denote the portions which are similar to those shown in FIG. 10(c), and a detailed explanation of which is dispensed with.

Figure 12:
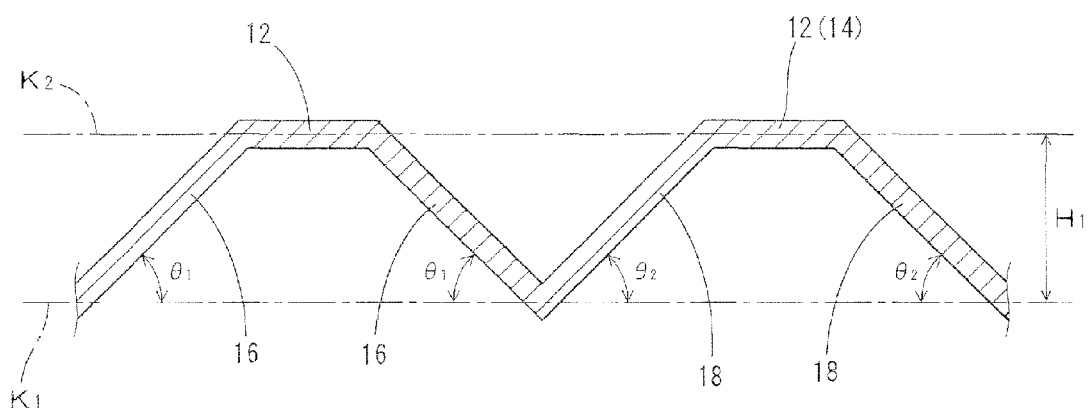
FIG. 12 is a cross sectional view corresponding to that of FIG. 5, showing a pattern in which the first region M and the second region N of the imaginary basic configurations A-D are raised in the same direction or recessed in the same direction.

The basic configurations A to D shown in FIGS. 10 and 11 have raised and recessed patterns obtained by upwardly raising the first regions M and forming the second regions N as flat surfaces. To the contrary, it is possible to form the first regions M as flat surfaces and raise the second regions N upwardly. Further, it is possible to recess either one of the first and second regions M and N of the basic configurations A to D. Moreover, the basic configurations A to D may have a raised and recessed pattern obtained by locating the partition lines X and Y in one reference plane while raising or recessing both of the first and second regions M and N toward another reference plane which is parallel to the above-described one reference plane. An enlarged partial cross sectional view of FIG. 12 shows a raised and recessed pattern having the raised portions 12 formed by upwardly raising both of the first and second regions M and N. In FIG. 12, the first and second partition lines X and Y are located in the first reference plane $K_1$, while the first and second regions M and N are raised upwardly, thereby forming the side walls 16 and 18 having the predetermined inclination angles $\theta_1$ and $\theta_2$, and the raised portions 12 (14) are located in the second reference plane $K_2$ which is spaced upwardly from the first reference plane $K_1$ by the predetermined distance $H_1$.

In the embodiments of the raised and recessed patterns of the basic configurations A to D illustrated in FIGS. 3-12, the raised portions 12 of the upwardly raised first regions M and the recessed portions 14 of the downwardly recessed second regions N have flat surfaces located in the respective reference planes. However, it is possible to form either one or both of the raised portions 12 and the recessed portions 14 so as to have an angular structure without any flat surface (a structure similar to an angular portion located in the reference plane $K_1$ of FIG. 12).

It is to be understood that the square shape of the basic configurations A to D needs not be a square in a strictly geometrical sense, but may be interpreted to include a shape which is generally recognized as a square or the like. It is also to be understood that each side of the square may be a slightly curved line, and that the corners and surfaces of the square may be rounded or provided with otherwise curved surfaces called "fillets." Further, in the raised and recessed patterns of the basic configurations A to D, the raised and recessed portions may have curved corner edges which connect flat surfaces of the raised and recessed portions, as well as corner edges defined by the flat surfaces intersecting with each other. Also, the positions of the partition lines X and Y of the basic configurations A to D which are indicated in the coordinate system by using the unit segment length "a" need not be defined by setting the unit segment length "a" to be an exact value of ⅙ of the length L of the square, and may be defined by using a unit segment length which is more or less different from the unit segment length "a," without departing from the scope of the present invention.

It is preferable that the side walls 16 and 18 which are formed by upwardly raising or downwardly recessing the first and second regions M and N of the basic configurations A to D have the inclination angles $\theta_1$ and $\theta_2$ within a range of 10° to 90° with respect to the first reference plane $K_1$, to make it possible to advantageously obtain the raised and recessed patterns which exhibit a high effect of improvement of the stiffness of the desired raised and recessed sheet material while maintaining the formability of the sheet material.

Where the inclination angle $\theta_1$ of the side wall 16 and the inclination angle $\theta_2$ of the side wall 18 are less than 10°, it becomes difficult to increase the height of the raised first region M and the depth of the recessed second region N, whereby the effect of improvement of the stiffness is deteriorated. The inclination angles $\theta_1$ and $\theta_2$ of more than 90° cause difficulty in the formation of the raised and recessed portions.

From the viewpoint of formability, it is particularly preferable that the inclination angles $\theta_1$ and $\theta_2$ are not more than 70° when the raised and recessed patterns of the imaginary basic configurations A to D are formed on a metallic sheet by press forming. Accordingly, the preferable range of the inclination angles $\theta_1$ and $\theta_2$ is 10° to 70°. Further, the plurality of the side walls 16 and 18 which are formed with the first and second regions M and N in the formation of the raised and recessed patterns of the basic configurations A to D need not have the same inclination angle. The plurality of the side walls 16 and 18 may have different inclination angles depending on their positions, and may have inclination angles which change in two or more steps. In such cases, the inclination angles should be set to be within the above-described preferable range.

All, three or two of the four basic configurations A to D having the above-described raised and recessed patterns are suitably combined such that the white-colored first regions M continuously contact with each other at each side (peripheral edge) of the squares, while the gray-colored second regions N continuously contact with each other at each side (peripheral edge) of the squares. The combination of the basic configurations is limited depending on the arrangement patterns of the first and second regions M and N of the basic configurations A to D. Namely, the basic configuration B or C can be arranged on the left, right, top and bottom sides of the basic configuration A. The basic configuration A or D can be arranged on the left, right, top and bottom sides of the basic configuration B. The basic configuration A or D can be arranged on the left, right, top and bottom sides of the basic configuration C. The basic configuration B or C can be arranged on the left, right, top and bottom sides of the basic configuration D. The plurality of the basic configurations A to D are combined according to the above-described arrangement patterns, whereby the desired raised and recessed sheet material is formed so as to have the raised and recessed pattern over the entire surface.

For example, a sheet material having an arrangement pattern of the basic configurations A to D shown in Table 1 given below is obtained by arranging the four basic configurations A, B, C and D in random order such that the shapes (lengths) of the first regions M of the combined basic configurations correspond to each other at their mutually contacting peripheral edges (sides), while the shapes (lengths) of the second regions N correspond to each other at their mutually contacting peripheral edges (sides). The raised and recessed sheet material having the above-described arrangement pattern has a complex pattern as shown in the plan view of FIG. 13 and a three-dimensional configuration as shown in FIGS. 14(a) and 14(b), which are constituted by a combination of the raised first regions M and the recessed second regions N.

TABLE 1

| C | A | B | D | C | D |
| D | B | A | C | D | C |
| B | A | B | A | B | A |
| D | C | D | C | A | B |
| C | D | C | D | B | A |
| D | B | A | C | A | B |

The raised and recessed sheet material according to the present invention obtained by combining a plurality of the above-described basic configurations A to D is generally advantageously produced by forming a suitable metallic sheet by press forming so as to have the raised and recessed patterns corresponding to the basic configurations A to D. The metallic sheet can be easily formed so as to have the raised and recessed portions by plastic working including press forming such as embossing, and roll forming, so that the metallic sheet is advantageously used to form the predetermined raised and recessed patterns of the above-described basic configurations A to D. As a material of the metallic sheet, it is possible to employ various known materials which can be formed by the plastic working, such as aluminum, an aluminum alloy, steel, copper and a copper alloy.

As a method of forming the desired raised and recessed patterns according to the present invention, a method such as casting or machining can be employed as well as the above-described plastic working such as press forming. It is also possible to form the raised and recessed portions on a sheet material made of a non-metallic material, such as a resin. Particularly, when a resin is used, the raised and recessed portions can be easily formed by a forming method such as injection molding or hot pressing. Use of the resin has advantages that the sheet material made of the resin has less limitations in the formation than the sheet material made of the metal, and that the freedom of design is increased. Further, the sheet material may be constituted as a stack of a metal layer and a resin layer, or a composite material.

It is preferable that the metallic sheet used for the production of the raised and recessed sheet material according to the present invention has a thickness t(mm) of 0.03 mm to 6.0 mm before the press forming. In this respect, it is noted that a metallic sheet having a thickness of less than 0.03 mm or more than 6.0 mm is less likely to be required to increase its stiffness for the intended application.

Further, where L(mm) represents the length of each side of the square of the basic configurations A to D which are selected to constitute the raised and recessed sheet material according to the present invention, and t(mm) represents the thickness of the metallic sheet before the press forming, it is preferable that the ratio L/t is within a range of 10 to 2000. A ratio L/t of less than 10 gives rise to a risk of increased difficulty of formation of the sheet material. A ratio L/t of more than 2000 makes it difficult to form the desired raised and recessed patterns, giving rise to a risk of failure to have a sufficiently high degree of stiffness of the sheet material.

Also, where H(mm), corresponding to the height $H_1$(mm) of the upwardly raised first regions M and the depth $H_2$(mm) of the downwardly recessed second regions N, represents the distance between the adjacent reference planes, and t(mm) represents the above-described thickness of the metallic sheet before the press forming, while $\theta$ (°) represents the maximum inclination angle of the side walls 16, 18 at the upwardly raised or downwardly recessed portions of the first and second regions M, N or first or second region M,N, it is preferable that the raised and recessed patterns are formed in the respective basic configurations A to D so as to satisfy an equation: $1 \leq H/t \leq -3\theta+272$. The ratio H/t of less than 1 gives rise to a risk of failure to have a sufficiently high degree of stiffness of the sheet material by the formation of the raised and recessed portions in the first and second regions M and N. The ratio H/t of more than ($-3\theta+272$) gives rise to a risk of increased difficulty of formation of the sheet material.

The thus obtained raised and recessed sheet material according to the present invention has extremely improved bending stiffness and extremely high surface stiffness, such that the sheet material as itself can be used for various applications as the sheet material having a light weight and a high degree of stiffness. Further, the sheet material is advantageously used as a laminated structure. The laminated structure may be constituted as a three-layered stack consisting of the raised and recessed sheet material according to the present invention as a core material, and two face sheets disposed on the respective opposite sides of the sheet material. Further, the laminated structure may be constituted as a multi-layered stack consisting of a plurality of the above-described three-layered basic structures, namely, a multi-layered stack consisting of a plurality of the raised and recessed sheet materials according to the present invention and the face sheets which are alternately stacked on each other. Of course, it is possible to employ a laminated structure consisting of a plurality of the raised and recessed sheet materials directly stacked on each other as a core material, and a face sheet bonded to at least one of the opposite surfaces of the core material. Further, the raised and recessed sheet material may be constituted as a laminated structure consisting solely of a plurality of the raised and recessed sheet materials directly stacked on each other. The number of the raised and recessed sheet materials to be stacked can be suitably changed according to the application of the obtained laminated structure or its required performance, for example.

A vehicle panel using the raised and recessed sheet material according to the present invention can be suitably used not only for a hood of a vehicle, but also as a panel of a door, roof, floor, trunk lid or the like, their reinforcing member, and an energy absorbing member such as a bumper, crash box, door beam or the like, for example. Where the vehicle panel includes an outer panel and an inner panel fixed to the back surface of the outer panel, one or both of the inner and outer panels is/are constituted by the raised and recessed sheet material according to the present invention. As a material of the outer and inner panels, a steel material or an aluminum alloy material is used, for example.

Features of the present invention will be more specifically described by showing various arrangement examples of a plurality of the above-described basic configurations A to D used in combination, which constitute the surface of the raised and recessed sheet material. It is to be understood that the present invention is by no means limited to those specific arrangement examples. It is also to be understood that the present invention can be embodied with various other arrangements which may occur to those skilled in the art without departing from the spirit and scope of the present invention.

The basic configuration A which is the base of the basic configurations A to D employed in the arrangement examples described below has the arrangement pattern of the first and second regions M and N as shown in FIG. 1. In the basic configuration A, the length L of each side of the square is 24 mm, and the value "a" obtained by dividing the length L into six equal segments is 4 mm, while the inclination angle of the connecting lines $C_X$ and $C_Y$ with respect to each side of the square is 45°. The positions of the points $A_2$ and $B_3$ are respectively represented as (4 mm, 14.4 mm) and (20 mm, 9.6 mm). In the connecting lines $C_x$ and $C_y$, inclined segments have a length of 11.3 mm and segments extending in the vertical direction as seen in FIG. 1 have a length of 2.4 mm. The first regions M are upwardly raised by a height of 1.5 mm, and the second region N is downwardly recessed by a depth of 1.5 mm. The side walls (side surfaces) 16, 18 of the first and second regions M and N have an inclination angle of 30°. The sheet material has a thickness of 0.273 mm after the formation of the raised and recessed portions, which is selected taking account of an increase of the surface area. FEM analysis was performed on the sheet material as described below. Further, the basic configurations B, C and D corresponding to the above-described basic configuration A and respectively shown in FIGS. 3(b)-3(d) are also used.

Arrangement Example 1

Figure 13:
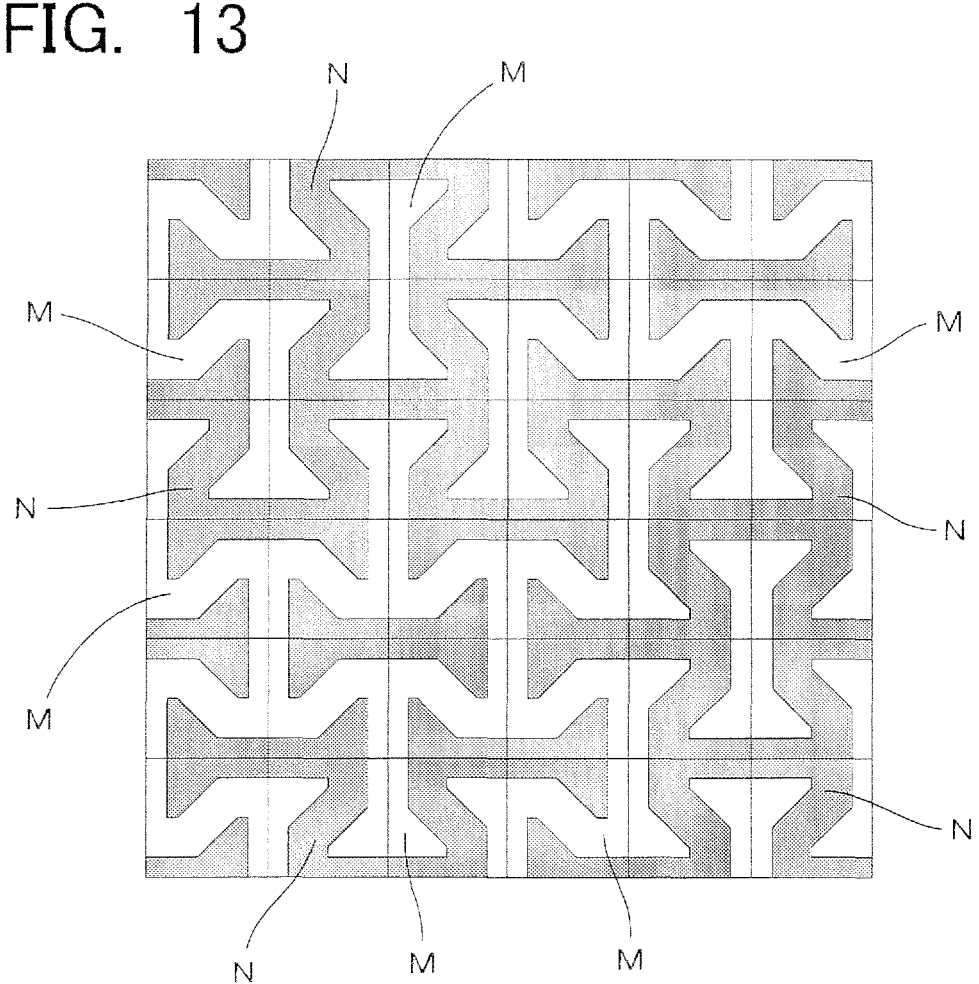
FIG. 13 is a plan view showing an entirety of a surface of the sheet material configured according to an arrangement example 1 of the first and second regions M and N.
Figure 14:
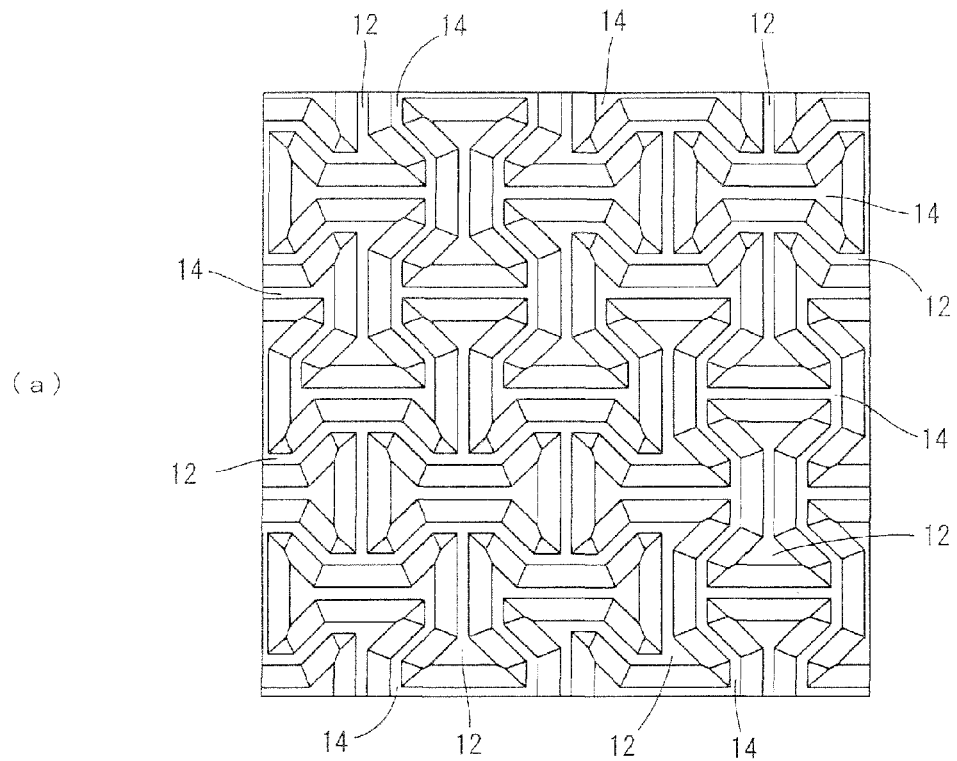
FIGS. 14(a) and (b) are schematic views of a raised and recessed sheet material according to the arrangement example 1, with FIG. 14(a) being a plan view and FIG. 14(b) being a perspective view showing the raised and recessed pattern.
Figure 14:
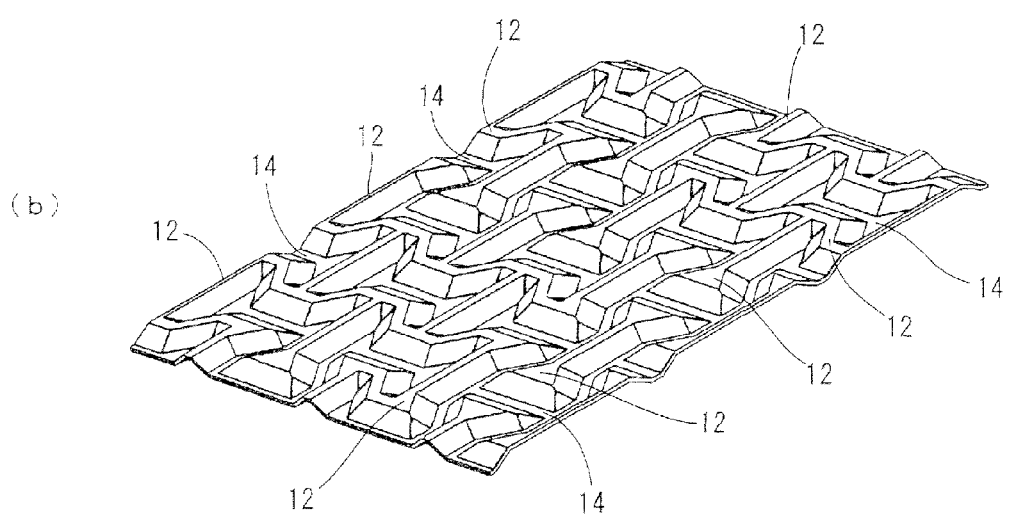

By arranging the basic configurations A to D in random order as shown in Table 1, the entire surface of the sheet material has an arrangement pattern formed by a combination of the first and second regions M and N in an area of 144 mm×144 mm as shown in FIG. 13. The thus obtained raised and recessed sheet material is shown in the plan view of FIG. 14(a), and the perspective view in FIG. 14(b).

The bending stiffness of the raised and recessed sheet material according to the arrangement example 1 was evaluated by the FEM analysis as described below. Namely, the bending stiffness of the sheet material was evaluated based on a displacement value of the sheet material obtained by fixing the sheet material shown in FIG. 14(a) at its lower end and applying a load of 1N to the center portion of the upper end. Further, a ratio of the above-described displacement value to a displacement value of a flat sheet of 144 mm×144 mm×0.3 mm was obtained as a value for evaluating the bending stiffness of the raised and recessed sheet material in the direction of 0 degree. As a result, it was found that the bending stiffness of the raised and recessed sheet material according to the arrangement example 1 in the direction of 0 degree is improved by 16.59 times that of the flat sheet.

Further, the raised and recessed sheet material shown in FIG. 14(a) was fixed at its left end and a load of 1N was applied to the center portion of the right end, thereby obtaining the displacement value of the sheet material. A ratio of the obtained displacement value to a displacement value of the flat sheet of 144 mm×144 mm×0.3 mm was obtained as a value for evaluating the bending stiffness of the raised and recessed sheet material in the direction of 90 degrees. As a result, it was found that the bending stiffness of the raised and recessed sheet material according to the arrangement example 1 in the direction of 90 degrees is improved by 18.56 times that of the flat sheet having a thickness of 0.3 mm.

According to the results of the above-described FEM analysis, the raised and recessed sheet material according to this arrangement example has the bending stiffness improved by the stiffness ratio G of 16.59 times the bending stiffness of the flat sheet even in the direction of 0 degree in which the effect of improvement of the stiffness is relatively small. The raised and recessed sheet material is expected to have a weight reduction percent value W(%) of at least about 60%, which is calculated by using the stiffness ratio G, according to a formula $W=(1-1/\sqrt[3]{G})\times 100$.

Further, the surface stiffness of a raised and recessed sheet material according to the arrangement example 1, which is a circular sheet, was evaluated by performing the FEM analysis. This circular sheet used as a test piece has a radius of 120 mm. The circular sheet was fixed so as to prevent displacement of its outer circumference in the vertical direction, and a load of 1N was applied to the center portion of the circular sheet, thereby obtaining a displacement value of the center portion. By comparing the displacement value of the raised and recessed sheet material (circular sheet test piece) according to the arrangement example 1 with a displacement value of a flat circular sheet having a thickness of 0.3 mm, it was found that the surface stiffness of the raised and recessed sheet material according to the arrangement example 1 is improved by 27.08 times that of the flat circular sheet.

Thus, the results of approximate calculations of the FEM analysis show that the raised and recessed sheet material according to the arrangement example 1 exhibits an extremely high degree of surface stiffness as well as the high degree of bending stiffness.

Arrangement Example 2

Figure 15:
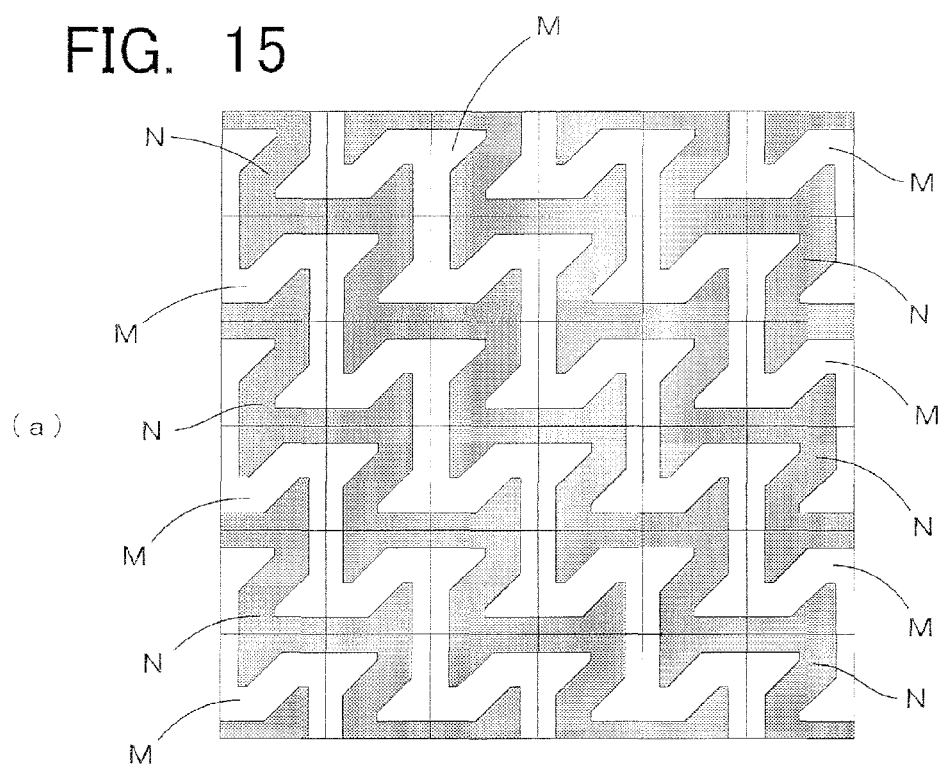
FIGS. 15(a) and (h) are schematic views of a raised and recessed sheet material according to an arrangement example 2, with FIG. 15(a) being a plan view of an entirety of a surface of the sheet material showing an arrangement pattern of the first and second regions M and N, and FIG. 15(b) being a plan view showing the raised and recessed pattern of the sheet material.
Figure 15:
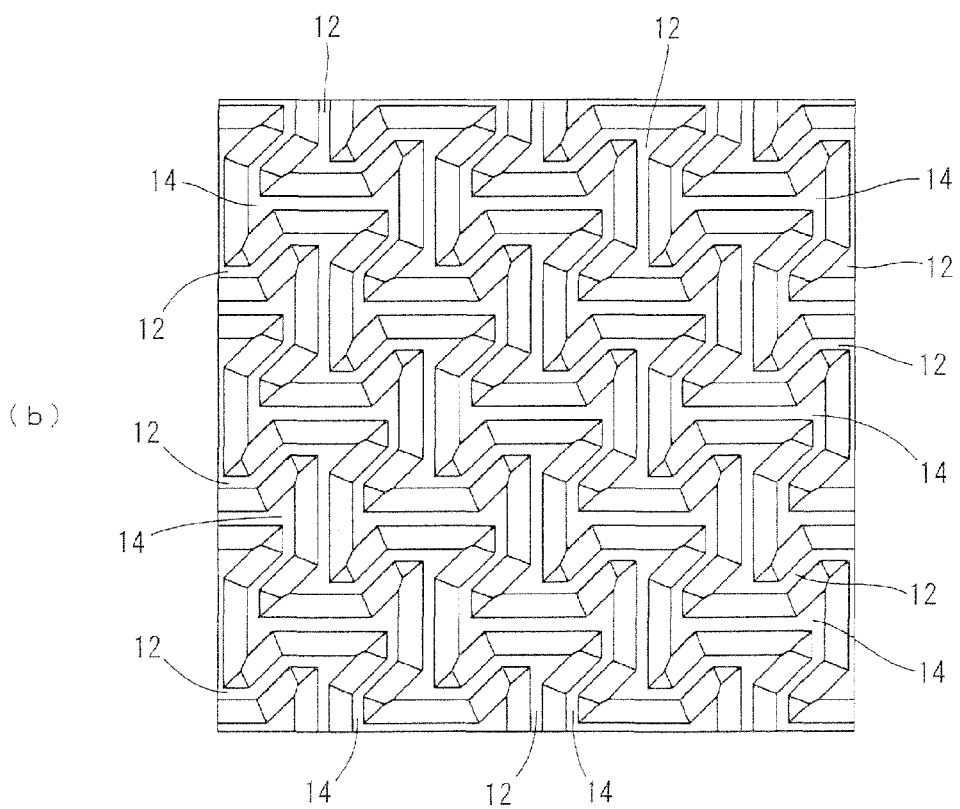

Among the basic configurations A to D, two basic configurations B and D were regularly arranged in a pattern shown in Table 2 given below, thereby obtaining a sheet material having an arrangement pattern of the first and second regions M and N shown in FIG. 15(a) and a raised and recessed pattern shown in FIG. 15(b).

TABLE 2

| B | D | B | D | B | D |
| D | B | D | B | D | B |
| B | D | B | D | B | D |
| D | B | D | B | D | B |
| B | D | B | D | B | D |
| D | B | D | B | D | B |

The FEM analysis was performed on the thus obtained raised and recessed sheet material according to the arrangement example 2 as in the case of the arrangement example 1. As a result, it was found that the bending stiffness of the raised and recessed sheet material in the direction of 0 degree is improved by 15.74 times that of the flat sheet having a thickness of 0.3 mm, and the bending stiffness in the direction of 90 degrees is improved by 15.99 times that of the flat sheet. Since the raised and recessed sheet material according to the arrangement example 2 has the same configuration in the directions of 0 degree and 90 degrees, a difference between the two stiffness ratios obtained by the above-described FEM analysis is considered as a variation due to different states of fixing at the fixed ends, for example.

Further, according to a result of the FEM analysis of the surface stiffness of the raised and recessed sheet material according to the arrangement example 2, it was found that the surface stiffness of the raised and recessed sheet material is significantly improved by 27.36 times that of the flat sheet having a thickness of 0.3 mm.

Arrangement Example 3

By employing an arrangement pattern shown in Table 3 given below, wherein rows in which the basic configurations B and D are regularly arranged in the horizontal direction, and rows in which the basic configurations C and A are regularly arranged in the horizontal direction, are alternately arranged in the vertical direction (upward/downward direction), the entire surface of the sheet material has the arrangement pattern of the first and second regions M and N shown in FIG. 16(a) and the three-dimensional configuration shown in FIG. 16(b).

The FEM analysis was performed on the raised and recessed sheet material according to the arrangement example 3 as in the case of the above-described arrangement example 1. As a result, it was found that the bending stiffness of the raised and recessed sheet material in the direction of 0 degree is improved by 20.91 times that of the flat sheet having a thickness of 0.3 mm, and the bending stiffness in the direction of 90 degrees is improved by 15.19 times that of the flat sheet.

The surface stiffness of the raised and recessed sheet material according to the arrangement example 3 was evaluated by the FEM analysis as in the case of the arrangement example 1. As a result, it was found that the surface stiffness of the raised and recessed sheet material is improved by 26.58 times that of the flat sheet having a thickness of 0.3 mm.

TABLE 3

| D | B | D | B | D | B |
|---|---|---|---|---|---|
| C | A | C | A | C | A |
| D | B | D | B | D | B |
| C | A | C | A | C | A |
| D | B | D | B | D | B |
| C | A | C | A | C | A |

Figure 16:
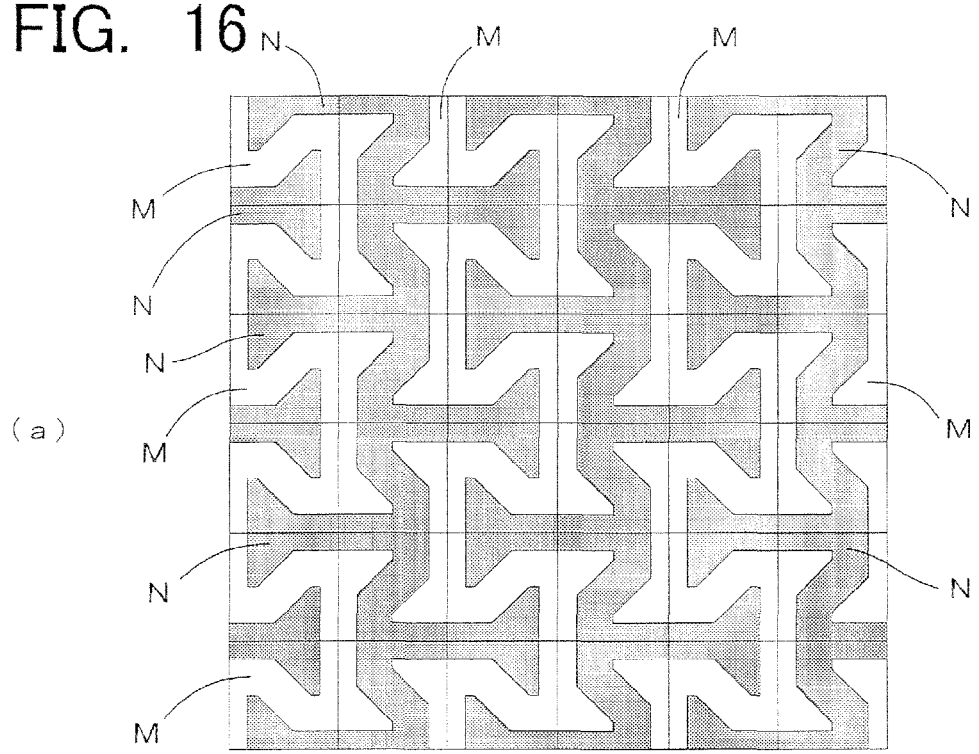
FIGS. 16(a) and (b) are schematic views of a raised and recessed sheet material according to an arrangement example 3, with FIG. 16(a) being a plan view of an entirety of a surface of the sheet material showing an arrangement pattern of the first and second regions M and N, and FIG. 16(b) being a plan view showing the raised and recessed pattern of the sheet material.
Figure 16:
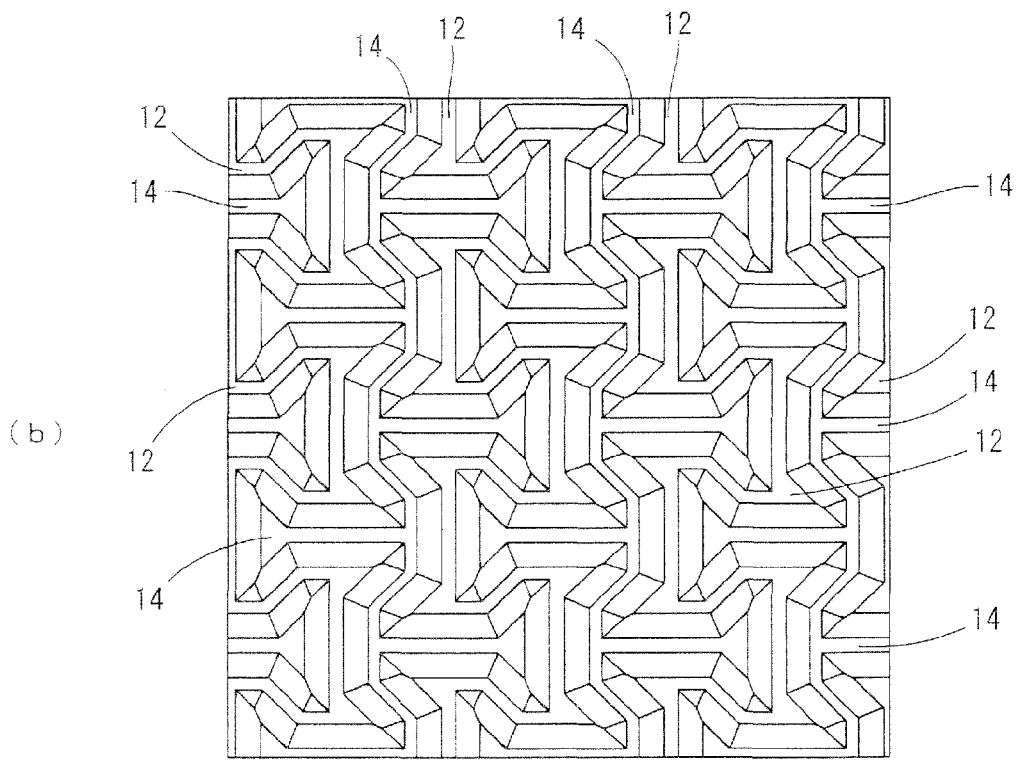
Figure 17:
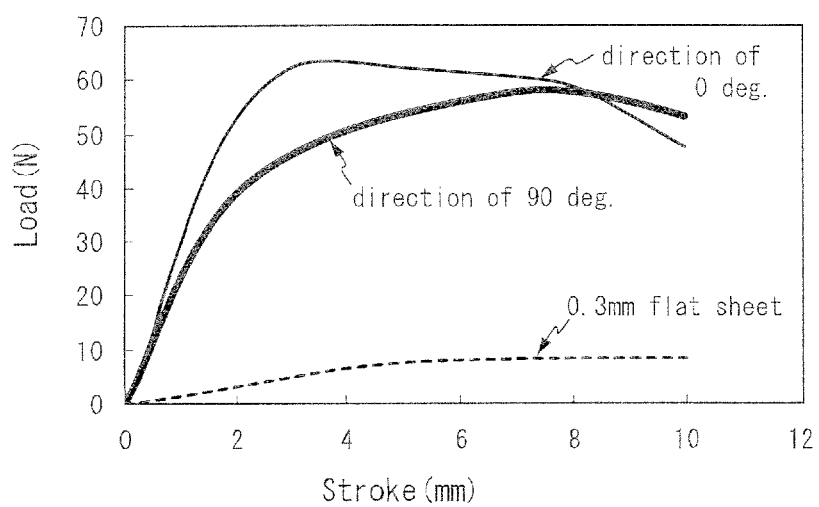
FIG. 17 is a diagram showing load displacement curves obtained in the arrangement example 3.

Further, a raised and recessed sheet material according to the arrangement example 3 as shown in FIG. 16 was produced by press forming using a sheet made of an aluminum alloy (JIS A3004-O) and having a thickness of 0.3 mm. A three-point bending test (support span 80 mm) was performed on the raised and recessed sheet material, thereby obtaining load displacement curves shown in the diagram of FIG. 17. FIG. 17 shows results of the raised and recessed sheet material in the directions of 0 degree and 90 degrees, together with results of a flat sheet (having a thickness of 0.3 mm). As is shown in FIG. 17, the raised and recessed sheet material according to the present invention has an extremely high degree of stiffness compared with that of the flat sheet. Further, by calculating a gradient (N/mm) of an initial straight portion of each load displacement curve in FIG. 17, it was found that the sheet material according to the present invention has a gradient of 33.77N/mm in the direction of 0 degree and a gradient of 25.58N/mm in the direction of 90 degrees, which are significantly larger than a gradient of 1.63N/mm of the flat sheet. It will also be understood from the results shown in FIG. 17 that an amount of absorbed energy is significantly increased.

Figure 18:
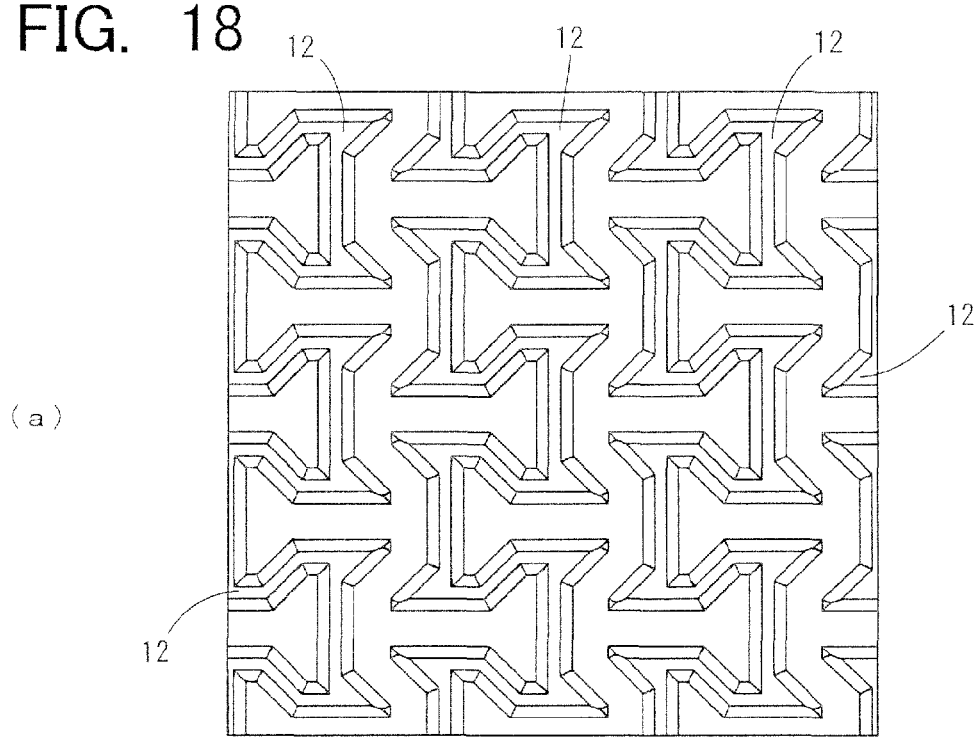
FIGS. 18(a) and (h) are schematic views of other examples of the raised and recessed pattern of the sheet material having the arrangement pattern according to the arrangement example 3, with FIG. 18(a) being a plan view of the raised and recessed pattern formed by raising only the first regions M upward, and FIG. 18(b) being a plan view of the raised and recessed pattern formed by recessing only the second regions N downward.
Figure 18:
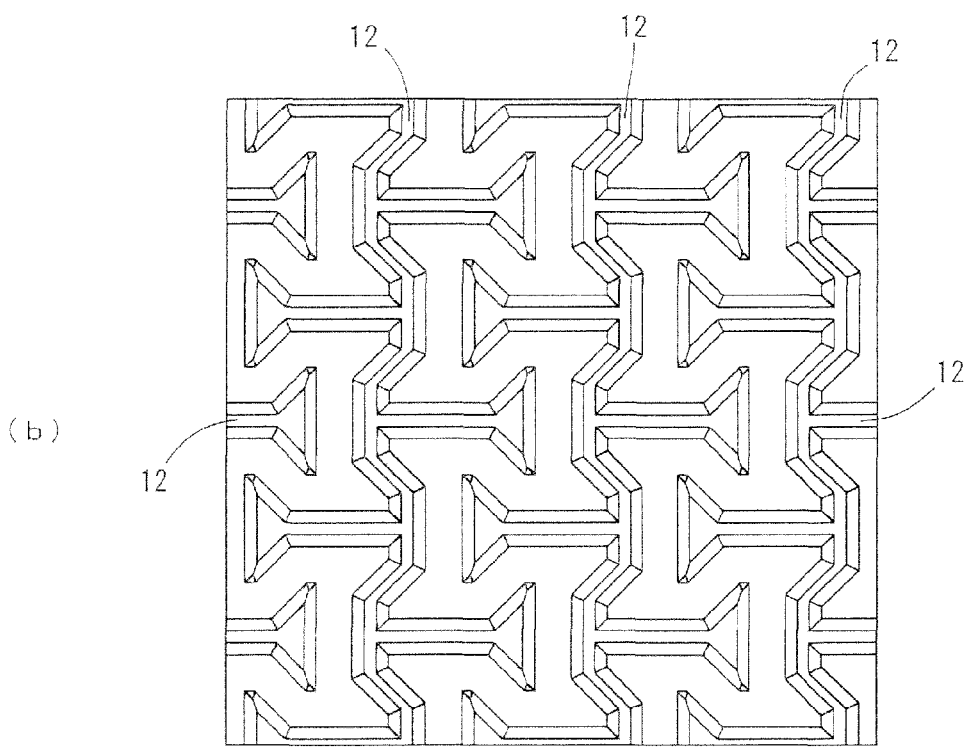
Figure 19:
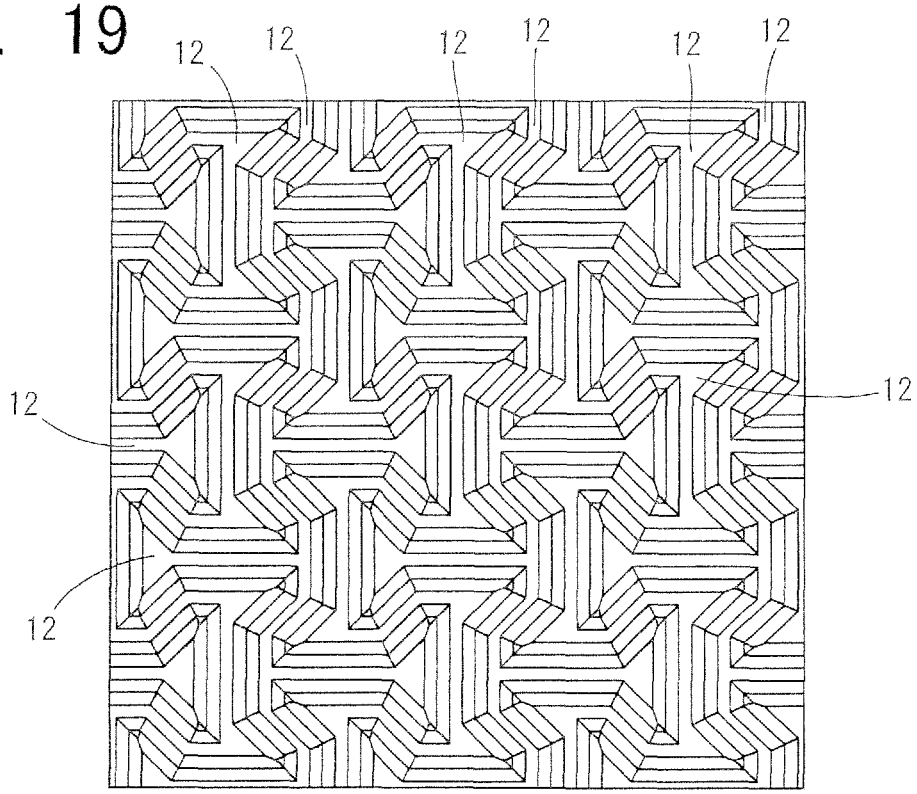
FIG. 19 is a plan view showing the raised and recessed pattern of the surface of the sheet material having the arrangement pattern according to the arrangement example 3, which is formed by upwardly raising both of the first regions M and the second regions N.

According to the arrangement example 3, a sheet material having a three-dimensional configuration as shown in FIG. 18(a) is obtained by upwardly raising only the first regions M and forming the second regions N as flat regions (which are not recessed downwardly or raised upwardly), and a sheet material having a three-dimensional configuration as shown in FIG. 18(b) is obtained by forming the first regions M as flat regions and upwardly raising the second regions N. Further, a sheet material having a three-dimensional configuration as shown in FIG. 19 is obtained by upwardly raising both of the first and second regions M and N. Thus, a predetermined raised and recessed sheet material can be obtained by locating the first and second partition lines X and Y in one of two reference planes, and upwardly raising or downwardly recessing either one or both of the first and second regions M and N such that the raised or recessed portions are located in the other reference plane.

Arrangement Example 4

Figure 20:
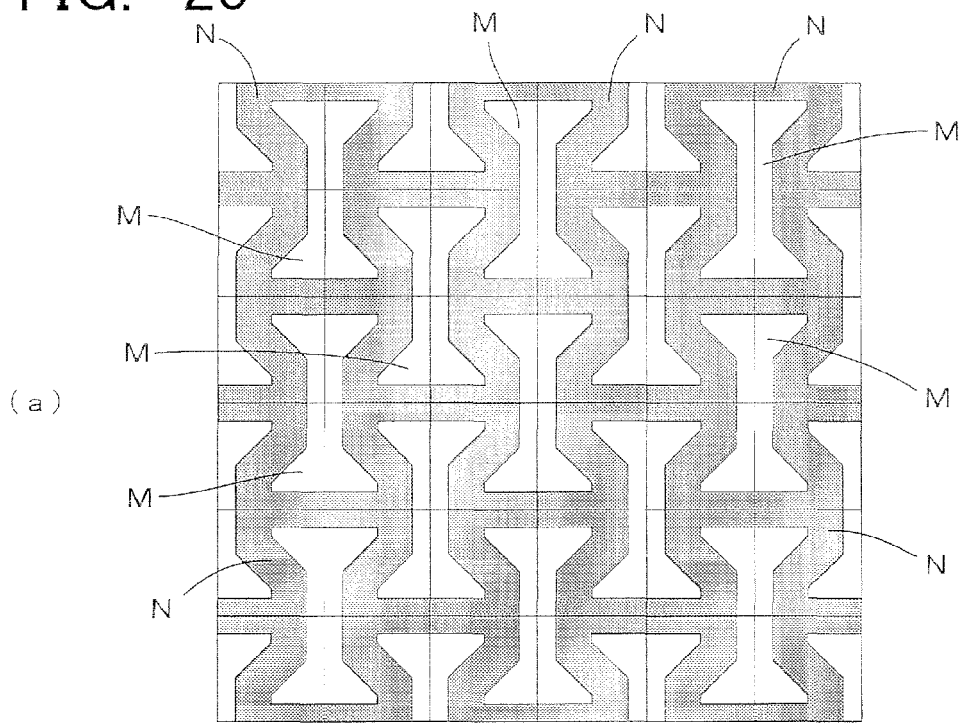
FIGS. 20(a) and (h) are schematic views of the entire surface of the raised and recessed sheet material according to an arrangement example 4, with FIG. 20(a) being a plan view of an entirety of the surface of the sheet material showing an arrangement pattern of the first and second regions M and N, and FIG. 20(b) being a plan view showing the raised and recessed pattern of the sheet material.
Figure 20:
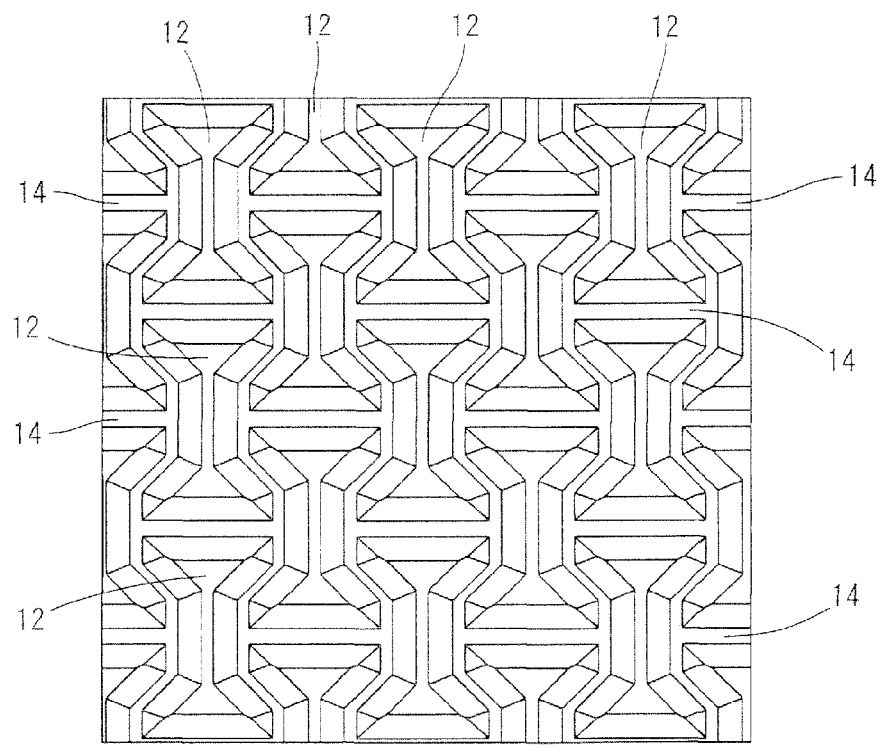

The basic configurations A and B are regularly arranged in a pattern shown in Table 4 given below so as to obtain a sheet material having an arrangement pattern of the first and second regions M and N shown in FIG. 20(a) and a three-dimensional configuration shown in FIG. 20(b).

TABLE 4

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

The FEM analysis was performed on the raised and recessed sheet material having such raised and recessed pattern as in the case of the arrangement example 1. As a result, it was found that the bending stiffness of the raised and recessed sheet material in the direction of 0 degree is improved by 26.39 times that of the flat sheet having a thickness of 0.3 mm, and its bending stiffness in the direction of 90 degrees is improved by 9.84 times that of the flat sheet.

According to a result of the FEM analysis of the surface stiffness of the raised and recessed sheet material according to the arrangement example 4, it was found that the surface stiffness of the raised and recessed sheet material is improved by 26.89 times that of the flat sheet having a thickness of 0.3 mm.

Arrangement Example 5

Figure 21:
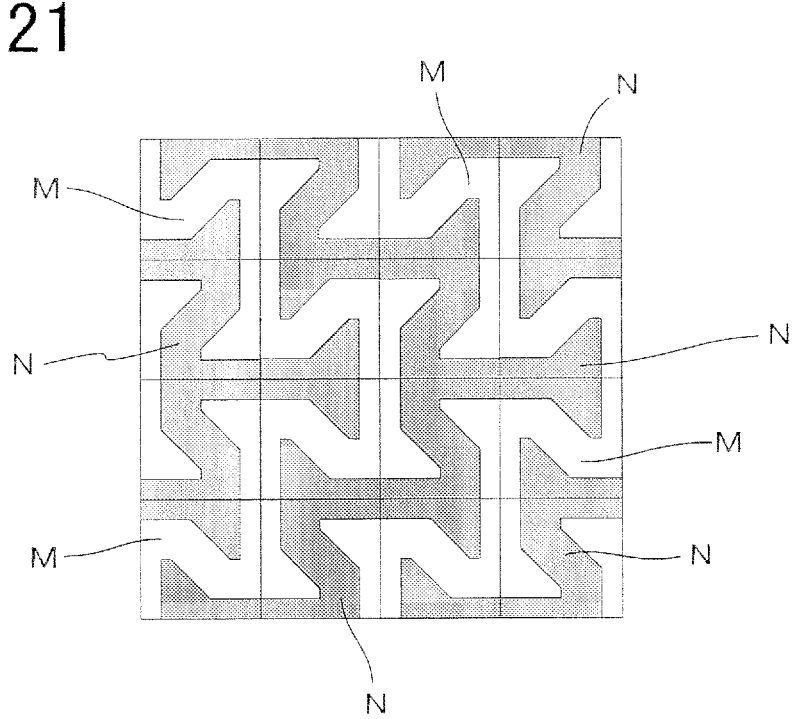
FIG. 21 is a plan view of a raised and recessed sheet material according to the arrangement example 5, showing a pattern of a surface of the sheet material consisting of the first and second regions M and N.

By employing a pattern in which an area formed by regularly arranging the basic configurations D and B, and an area formed by regularly arranging the basic configurations A and C are combined in the vertical direction as shown in Table 5 given below, there is obtained a raised and recessed sheet material having an entire surface according to an arrangement pattern of the first and second regions M and N as shown in FIG. 21.

TABLE 5

| D | B | D | B |
|---|---|---|---|
| B | D | B | D |
| A | C | A | C |
| C | A | C | A |

Arrangement Example 6

Figure 22:
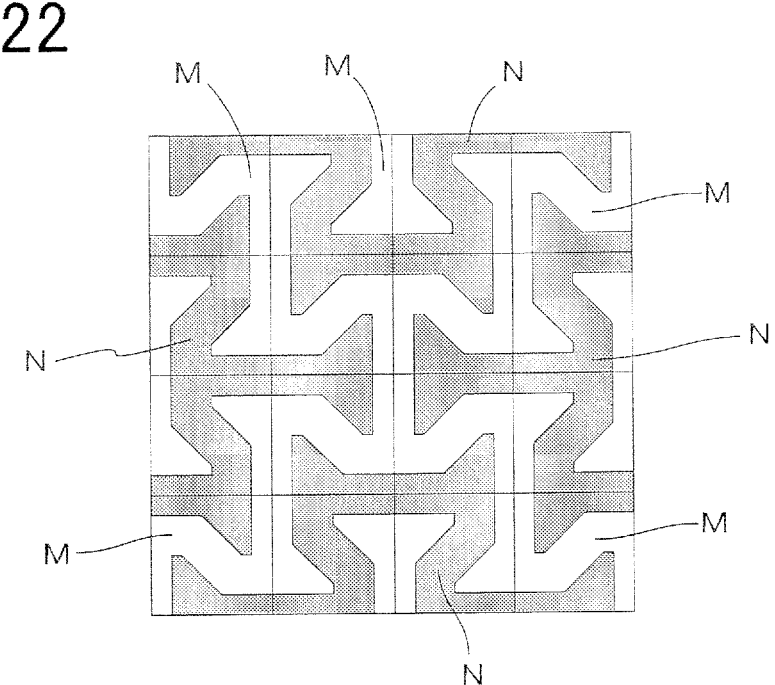
FIG. 22 is a plan view of a raised and recessed sheet material according to the arrangement example 6, showing a pattern of a surface of the sheet material consisting of the first and second regions M and N.

By arranging the basic configurations D, B, A and C as shown in Table 6 given below, there is obtained a raised and recessed sheet material having an entire surface according to an arrangement pattern of the first and second regions M and N as shown in FIG. 22.

TABLE 6

| D | B | A | C |
| B | D | C | A |
| A | C | D | B |
| C | A | B | D |

Arrangement Example 7

Figure 23:
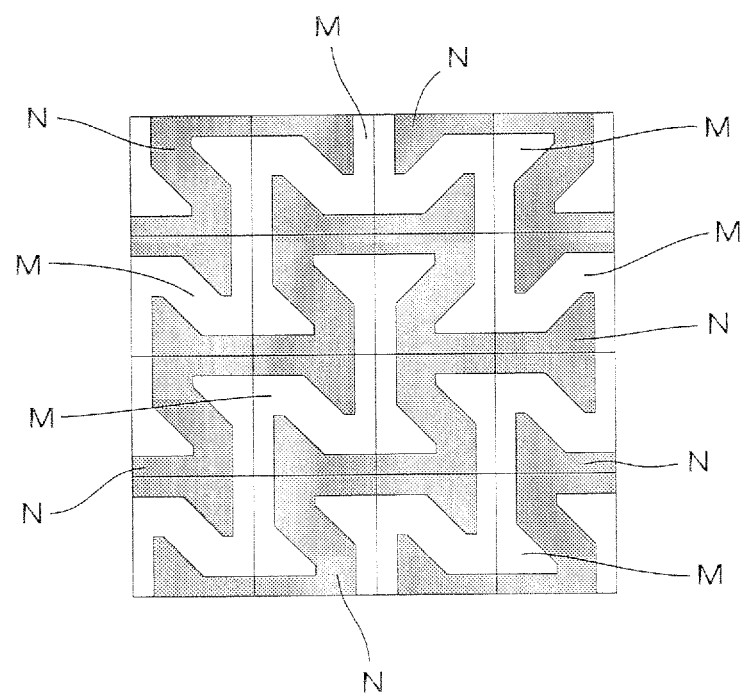
FIG. 23 is a plan view of a raised and recessed sheet material according to the arrangement example 7, showing a pattern of a surface of the sheet material consisting of the first and second regions M and N.

By arranging the basic configurations A, C, D and B as shown in Table 7 given below, there is obtained a raised and recessed sheet material having an entire surface according to an arrangement pattern of the first and second regions M and N as shown in FIG. 23.

TABLE 7

| A | C | D | B |
| C | A | B | D |
| A | C | A | C |
| C | A | C | A |

Arrangement Example 8

Figure 24:
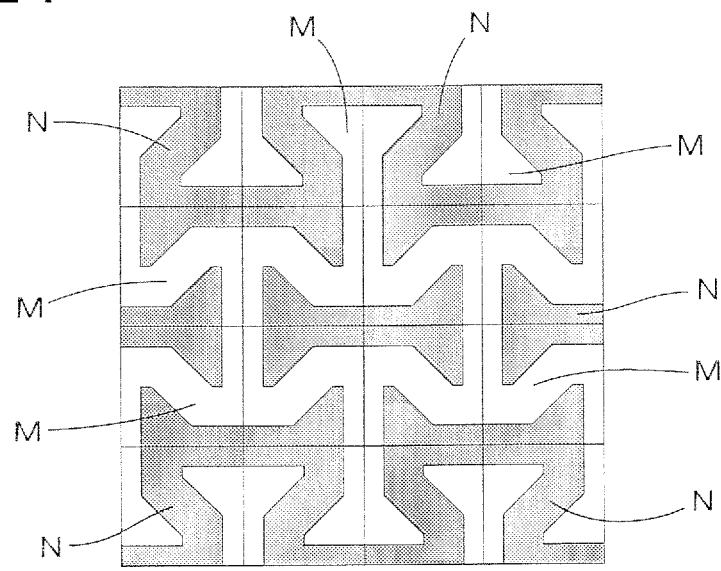
FIG. 24 is a plan view of a raised and recessed sheet material according to the arrangement example 8, showing a pattern of a surface of the sheet material consisting of the first and second regions M and N.

By regularly arranging the basic configurations A to D in the horizontal direction as shown in Table 8 given below, there is obtained a raised and recessed sheet material having an entire surface according to an arrangement pattern of the first and second regions M and N as shown in FIG. 24.

TABLE 8

| B | A | B | A |
| D | C | D | C |
| C | D | C | D |
| A | B | A | B |

Arrangement Example 9

Figure 25:
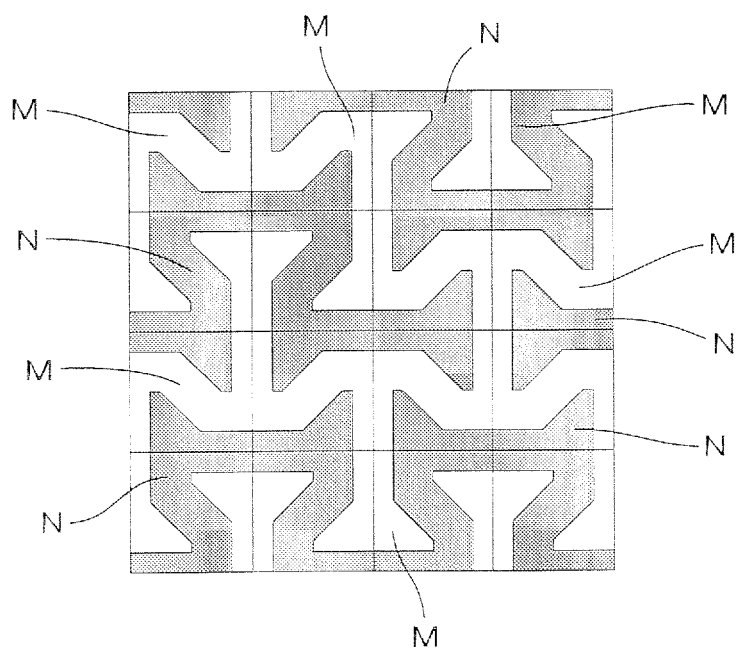
FIG. 25 is a plan view of a raised and recessed sheet material according to the arrangement example 9, showing a pattern of a surface of the sheet material consisting of the first and second regions M and N.

By arranging the basic configurations A to D in a pattern as shown in Table 9 given below, there is obtained a raised and recessed sheet material having an entire surface according to an arrangement pattern of the first and second regions M and N as shown in FIG. 25.

TABLE 9

| C | D | B | A |
| A | B | D | C |
| C | D | C | D |
| A | B | A | B |

Arrangement Example 10

Figure 26:
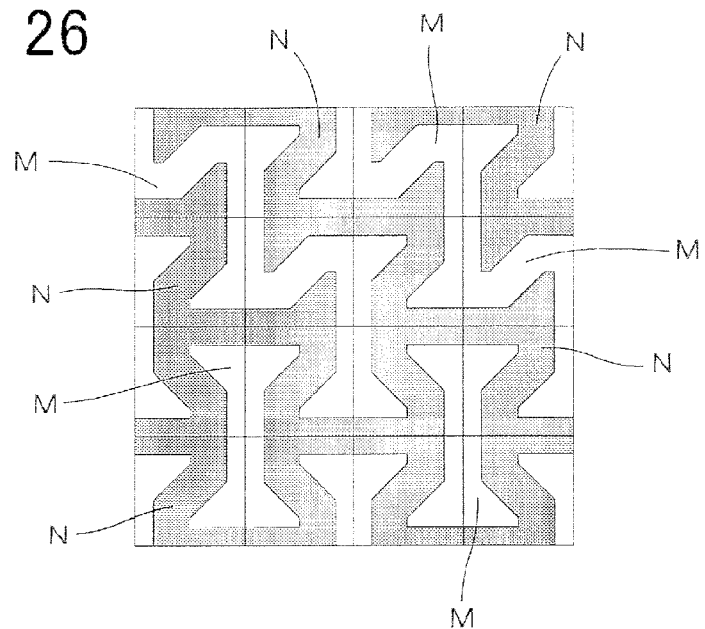
FIG. 26 is a plan view of a raised and recessed sheet material according to the arrangement example 10, showing a pattern of a surface of the sheet material consisting of the first and second regions M and N.

By arranging the three basic configurations A, B and D in a pattern as shown in Table 10 given below, there is obtained a raised and recessed sheet material having an entire surface according to an arrangement pattern of the first and second regions M and N as shown in FIG. 26.

TABLE 10

| D | B | D | B |
| B | D | B | D |
| A | B | A | B |
| B | A | B | A |

Cylindrical Shell Structure

Figure 27:
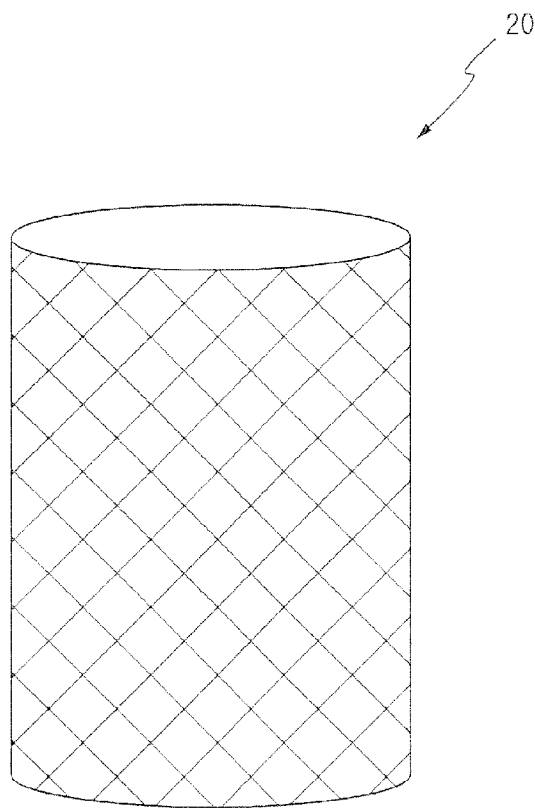
FIG. 27 is a schematic view showing a cylindrical body having the raised and recessed portions.

The raised and recessed sheet material according to the present invention can be formed so as to have a cylindrical shape as shown in FIG. 27. In this case, the raised and recessed portions 12, 14 of the first and second regions M, N and the first and second partition lines X, Y are located in two or three coaxial reference cylinders derived from the reference planes $K_1$ to $K_3$. The configuration of the first and second regions M and N constituting the raised and recessed pattern is similar to the above-described examples.

By using a cylindrical body 20 having the raised and recessed portions for a cylindrical structure such as a beverage can or a rocket, the stiffness of the cylindrical structure can be improved without increasing the thickness of the material. Further, the cylindrical body 20 has an excellent energy absorbing property such that a vehicle body using the cylindrical body 20 can have a high degree of stiffness and an excellent energy absorbing property.

Laminated Structure

Figure 28:
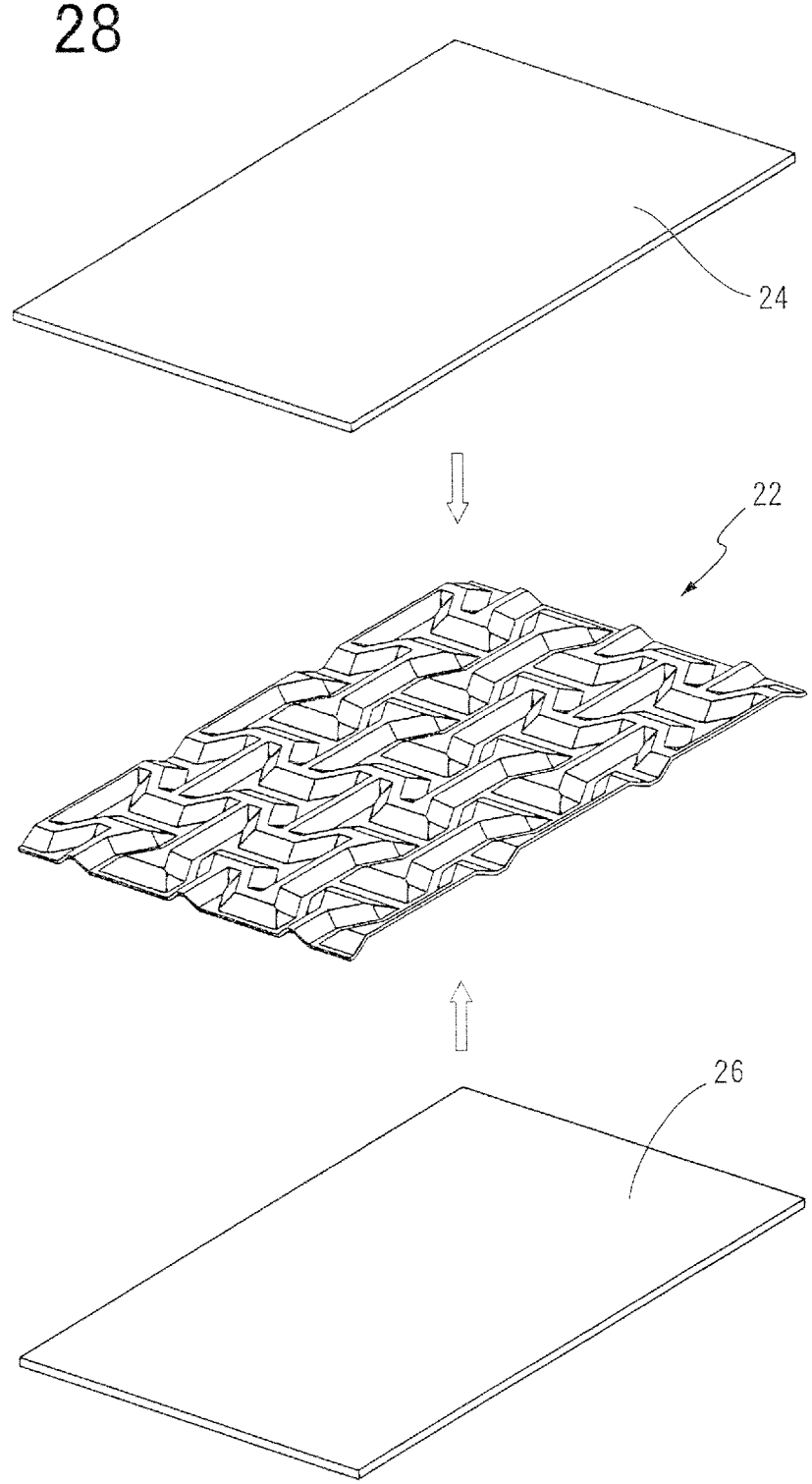
FIG. 28 is an exploded view showing an example of a laminated structure.

FIG. 28 shows an example of a laminated structure according to the present invention. The laminated structure consists of a sheet material 22 having the raised and recessed portions according to the arrangement example 1 and face sheets 24, 26 bonded to respective opposite surfaces of the sheet material 22. The face sheets 24, 26 are made of a 3000-series aluminum alloy of JIS and have a thickness of 1.0 mm.

The laminated structure is obtained by using the raised and recessed sheet material 22 having a high degree of stiffness as a core material, and bonding the face sheets 24, 26 to the respective opposite surfaces of the raised and recessed sheet material 22 by adhesive bonding or brazing, for example. Thus, the laminated structure can be used as a material having a significantly higher degree of stiffness than a single raised and recessed sheet material 22. Further, the weight of the laminated structure can be advantageously reduced by forming the sheet material 22 and the face sheets 24, 26 using aluminum alloy sheets.

Further, a vibration damping effect can be improved owing to the improvement of the stiffness, and a sound absorbing effect can be improved in the presence of air layers. Further, as is well known, a Helmhorz-type sound absorbing structure can be obtained by forming through-holes through either one of the face sheets 24, 26, whereby the sound absorbing effect can be further improved. The face sheets 24, 26 may be formed of metal sheets other than the aluminum alloy sheets, such as steel sheets or titanium sheets, or resin sheets, for example.

Vehicle Panel

Figure 29:
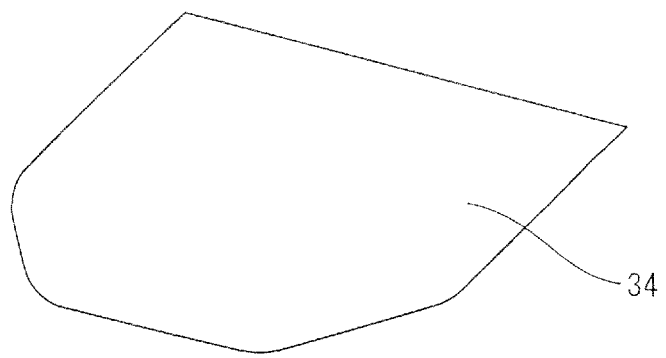
FIG. 29 is an exploded view showing an example of a vehicle panel.
Figure 29:
Figure 29:
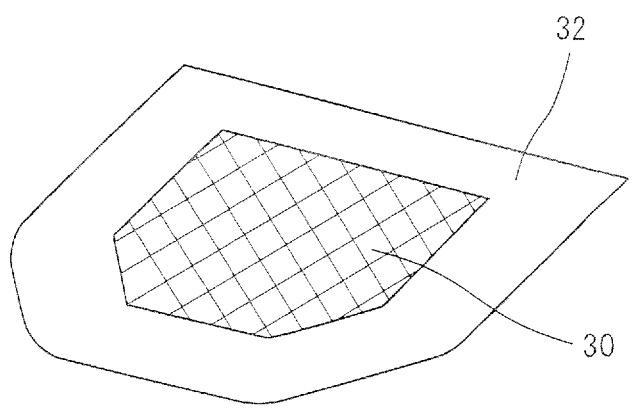

FIG. 29 shows an example of a vehicle panel obtained by using a sheet material 32 having a raised and recessed portion 30 according to the present invention as an inner panel, and disposing the sheet material 32 such that one of its opposite surfaces is opposed to the back surface of an outer panel 34. The sheet material 32 constituting the inner panel is bonded to the outer panel 34 at its outer peripheral portion, by hemming, for example.

The sheet material 32 having the raised and recessed portion 30 and constituting the inner panel of the vehicle panel shown in FIG. 29 has a high effect of improvement of the stiffness as described above. Therefore, the vehicle panel has an excellent property of absorbing impact energies generated by primary and secondary collisions with a pedestrian. Also, the vibration damping effect can be improved owing to the improvement of the stiffness, and the sound absorbing effect can be improved in the presence of air layers. Although the raised and recessed sheet material is used as the inner panel in this example, it is possible to use the sheet material as either one or both of the inner and outer panels.

NOMENCLATURE OF ELEMENTS

12: Raised portion
14: Recessed portion
16, 18: Side walls
20: Cylindrical body
22: Sheet material
24, 26: Face sheets
30: Raised and recessed portion 32: Sheet material
34: Outer panel

The invention claimed is:

1. A raised and recessed sheet material having a surface which is defined by a plurality of square sections arranged in two mutually perpendicular directions and which has a raised and recessed pattern, wherein an entire pattern of the surface is defined by a plurality of four basic configurations comprising, a basic configuration A defining pattern that is divided into three parts by a first partition line and a second partition line, the first partition line successively connecting points $A_1$, $A_2$, $A_3$ and $A_4$, which are respectively indicated as (a, 6a), (a, 3.5a~4a), (3a, a) and (0, a) in a two-dimensional orthogonal system, where a length L of each side of each of the square sections is divided into six equal segments, provided that L=6a, and the second partition line successively connecting points $B_1$ (6a, 5a), $B_2$ (3a, 5a), $B_3$ (5a, 2a~2.5a) and $B_4$ (5a, 0), wherein the first partition line linearly connects the points $A_1$ and $A_2$, and the points $A_3$ and $A_4$, the second partition line linearly connects the points $B_1$ and $B_2$, and the points $B_3$ and $B_4$, wherein a connecting line connecting the points $A_2$ and $A_3$ of the first partition line and a connecting line connecting the points $B_2$ and $B_3$ of the second partition line are spaced apart from a diagonal line connecting opposite corners (0, 6a) and (6a, 0) of the square section, and located so as to be rotationally symmetrical to each other with respect to a midpoint of the diagonal line, wherein parts of the square section not located between the first and second partition lines are defined as first regions, and a part of the square section located between the first and second partition lines is defined as a second region having a Z-shape as seen in a back view;

a basic configuration B, having a pattern according to the basic configuration A, but wherein the first regions and the Z-shaped second region are arranged to be line-symmetrical with respect to the basic configuration A;

a basic configuration C, having a pattern that is rotated 90° with respect to that of the basic configuration B, wherein the part of the square section located between the first and second partition lines is defined as a Z-shaped first region, and the parts of the square section not located between the first and second partition lines are defined as second regions; and a basic configuration D, having a pattern according to the basic configuration C, but wherein the Z-shaped first region and the second regions are arranged to be line-symmetrical with respect to that of the basic configuration C;

wherein the plurality of the four basic configurations are arranged in the two mutually perpendicular directions while being abutted to each other at peripheral edges thereof, so that peripheral edges of the first regions of the basic configurations are abutted together, and peripheral edges of the second regions of the basic configurations are abutted together;

wherein the raised and recessed pattern is formed on the entire surface by locating the first and second partition lines of each basic configuration in a first reference plane, which is an intermediate one of three mutually parallel imaginary reference planes which are spaced apart from each other in a vertical direction that is perpendicular to a plane of the sheet material, upwardly raising the first region of each basic configuration so that a raised portion of the first region is located in a second reference plane which is spaced upwardly from the first reference plane, and downwardly recessing the second region of each basic configuration, so that a recessed portion of the second region is located in a third reference plane, which is spaced downwardly from the first reference plane, or by locating the first and second partition lines of each basic configuration in one of two mutually parallel imaginary reference planes, which are spaced apart from each other in said vertical direction, and upwardly raising or downwardly recessing either one or both of the first and second regions of each basic configuration so that the raised portion or the recessed portion is located in the other reference plane.

2. The raised and recessed sheet material according to claim 1, wherein the connecting lines respectively connecting the points $A_2$ and $A_3$ and the points $B_2$ and $B_3$ are straight lines or curved lines.

3. The raised and recessed sheet material according to claim 1, wherein at least one of the raised portion and the recessed portion has a flat surface in the reference plane in which each of said at least one of the raised portion and the recessed portion is located.

4. The raised and recessed sheet material according to claim 1, wherein the surface of the sheet material is formed by using all of the basic configurations A to D.

5. The raised and recessed sheet material according to claim 1, wherein the surface of the sheet material is formed by using three of the basic configurations A to D.

6. The raised and recessed sheet material according to claim 1, wherein the surface of the sheet material is formed by using two of the basic configurations A to D.

7. The raised and recessed sheet material according to claim 1, wherein side surfaces of the upwardly raised or downwardly recessed portion of the first region and/or the second region have inclination angles within a range of 10° to 90°.

8. The raised and recessed sheet material according to claim 1, wherein the sheet material is obtained by forming the raised and recessed pattern on a metal sheet by press forming.

9. The raised and recessed sheet material according to claim 8, wherein the metal sheet before the press forming has a thickness of 0.03 mm to 6.00 mm.

10. The raised and recessed sheet material according to claim 8, wherein a ratio L/t between said length L(mm) of each side of the square and a thickness t(mm) of the metal sheet before the press forming is 10 to 2000.

11. The raised and recessed sheet material according to claim 8, wherein a relationship among a distance H(mm) between adjacent ones of the reference planes, the thickness t(mm) of the metal sheet before the press forming, and a maximum inclination angle $\theta(°)$ of the side surfaces of the upwardly raised or downwardly recessed portion of the first region and/or the second region satisfies an equation: $1 \leq H/t \leq -3\theta + 272$.

12. A laminated structure obtained by stacking a plurality of sheet materials, wherein at least one of the plurality of sheet materials is the raised and recessed sheet material according to claim 1.

13. A vehicle panel comprising an outer panel and an inner panel joined to a back surface of the outer panel, wherein either one or both of the outer panel and the inner panel is/are constituted by the raised and recessed sheet material according to claim 1.

* * * * *